(12) United States Patent
Han et al.

(10) Patent No.: US 8,805,664 B1
(45) Date of Patent: Aug. 12, 2014

(54) SYSTEM AND METHOD FOR SIMULATING BRANCHING BEHAVIOR

(75) Inventors: Zhi Han, Acton, MA (US); Murali Yeddanapudi, Watertown, MA (US); Pieter J. Mosterman, Framingham, MA (US); Xiaocang Lin, Sherborn, MA (US); Rajesh Pavan Sunkari, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 898 days.

(21) Appl. No.: 12/896,407

(22) Filed: Oct. 1, 2010

Related U.S. Application Data

(63) Continuation-in-part of application No. 11/894,681, filed on Aug. 21, 2007, now Pat. No. 8,126,691, which is a continuation of application No. 10/639,044, filed on Aug. 11, 2003, now Pat. No. 7,801,715.

(51) Int. Cl.
*G06F 17/50* (2006.01)

(52) U.S. Cl.
USPC .............................. 703/13; 703/14

(58) Field of Classification Search
None
See application file for complete search history.

(56) References Cited

U.S. PATENT DOCUMENTS

| | | | |
|---|---|---|---|
| 5,566,295 A | 10/1996 | Cypher et al. | |
| 5,838,949 A | 11/1998 | Hassoun | |
| 5,980,096 A * | 11/1999 | Thalhammer-Reyero | 1/1 |
| 5,987,242 A | 11/1999 | Bentley et al. | |
| 6,063,128 A | 5/2000 | Bentley et al. | |
| 6,173,241 B1 | 1/2001 | Trimberger | |
| 6,510,405 B1 * | 1/2003 | Gilbertson | 703/16 |
| 6,697,773 B1 * | 2/2004 | Karchmer et al. | 703/15 |
| 6,961,688 B2 | 11/2005 | Bankes | |
| 7,178,112 B1 | 2/2007 | Ciolfi et al. | |
| 7,353,157 B2 * | 4/2008 | Wasynczuk et al. | 703/14 |
| 2004/0210592 A1 | 10/2004 | Ciolfi et al. | |
| 2006/0117274 A1 | 6/2006 | Tseng et al. | |

OTHER PUBLICATIONS

Bozin, A.S., "Electrical Power Systems Modeling and Simulation Using Simulink," IEEE Colloquium on the Use of Systems Analysis and Modeling Tools Experiences and Applications, pp. 10/1-10/8 (1998).

Hayder, M.E. et al., "Three Parallel Programming Paradigms: Comparisons on an archetypal PDE Computation," Progress in Computer Research, Nova Science Publishers, Inc., pp. 17-38 (2001).

(Continued)

*Primary Examiner* — Omar Fernandez Rivas
*Assistant Examiner* — Nithya J Moll
(74) *Attorney, Agent, or Firm* — Nelson Mullins Riley & Scarborough LLP

(57) ABSTRACT

In an embodiment, a method of establishing directed relationships between states in a simulation is disclosed. The directed relationships may allow the simulation to proceed from an initial state according to two or more divergent behaviors. The simulation may merge if two or more behaviors result in states that are equivalent. The method may further allow a state of the simulation which has not been stored to be interpolated from one or more states that have been stored. In one embodiment, a system may receive a request to revert to a previous state, and the system may identify a saved state that is closest to the requested state. The system may simulate from the identified state to arrive at the requested state. In one embodiment, the simulation may be a hybrid simulation which is advanced in both discrete and continuous increments.

26 Claims, 16 Drawing Sheets

(56) References Cited

OTHER PUBLICATIONS

Hopler, Robert et al., "Model Integrated Computing in Robot Control to Synthesize Real-time Embedded Code," Proceedings of the 2001 IEEE International Conference on Control Applications, (2001).
MathWorks, Inc., "Using Simulink, Version 2.2," The Mathworks, Inc., pp. 1-10-1-13, 3-35-3-42, 4-2-4-23, 8-2-8-5, 8-46-8-47, 8-63-8-27, 9-25-9-27, 9-61-9-62, 9-144-9-148, 12-2-12-13 (1998).
MathWorks, Inc., "Simulink, Model Base and System-Based Design, Using Simulink, Version 5," The MathWorks, Inc. (2002).
Quinn, Michael J. et al., "Preliminary Results from a Parallel MATLAB Compiler," Proceedings of the First Merged International Symposium on Parallel and Distributed Processing, pp. 81-87 (1998).
Silberschatz, Abraham et al., "Operating System Concepts," 5th Edition, John Wiley & Sons, Inc., pp. 42-43, 89-97 and 847 (1999).

* cited by examiner

SYSTEM AND METHOD FOR SIMULATING BRANCHING BEHAVIOR

RELATED APPLICATIONS

This application is a continuation-in-part of, and claims priority to, U.S. patent application Ser. No. 11/894,681, filed on Aug. 21, 2007, which is a continuation of U.S. patent application Ser. No. 10/639,044, filed on Aug. 11, 2003, now U.S. Pat. No. 7,801,715, issued on Sep. 21, 2010. The contents of the aforementioned applications are incorporated herein by reference.

DETAILED DESCRIPTION

Figure 1:
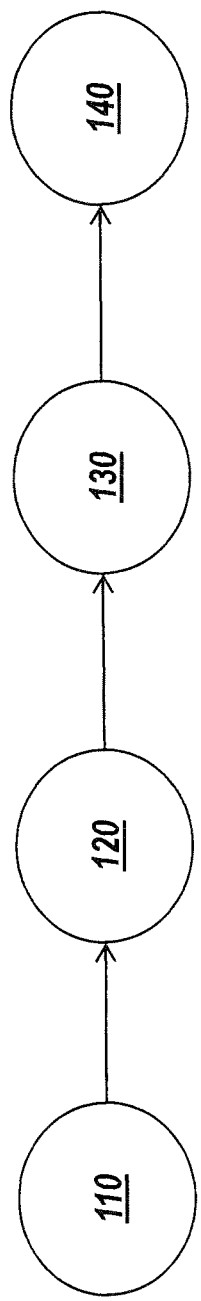
FIG. 1 depicts example states of a system during a linear simulation.

A model of a system can be used to effectively study the system, for example, by a simulation of the model. A simulation system may allow a model to be constructed and simulated so that the behavior of the model can be examined. During a simulation of a model, the state of the simulation may be stored at different points. The simulation system may assume that the simulation will proceed according to only a single pattern of behavior. If a user wishes to examine different patterns of behavior, the simulation may have to be re-run from the beginning using different assumptions.

Exemplary embodiments described herein may facilitate simulation of models that may exhibit multiple patterns of behavior at a particular point. At certain points, called branching points, a simulation may proceed according to two or more patterns of behavior. Some or all of the states of the system may be represented by branching states, from which multiple patterns of behavior may be followed. The simulation may be run to a branching state, which may be used as a new initial state to examine multiple patterns of behavior without having to reset the simulation to an original state.

At various times during a simulation of a system, the state of the system at that time may be stored for future review. In some embodiments, after branching states are introduced the pattern and/or evolution of states may become nondeterministic. For example, a state S1 may be the initial state in the simulation at time t=0, and two patterns of behavior may be possible such that the simulation may proceed to either state S2 or state S3 at time t=1. Accordingly, states S1, S2, and S3 may be stored. However, the relationship between these states may not be clear from the states alone. For example, it may be known that state S1 occurred at time t=0 and states S2 and S3 are possible alternatives which may occur at time t=1, but this information alone may not be sufficient to determine (for example) how to reach state S2 from state S1. Directed relationships may be provided, which may describe when and/or how a system may change from a first state to a second state. For example, a directed relationship may describe a predecessor state and a successor state, and may include information about behavior of the system that caused the predecessor state to change into the successor state.

After a simulation completes, a user may want to restart the simulation from a certain point (e.g., halfway through the simulation), so that, for example, alternative behaviors may be examined. States and directed relationships described herein may be used to facilitate an efficient playback or restoration of model simulations. Using states and directed relationships described herein, a requested system state may be restored, for example, after a simulation is completed. The requested state may be restored, regardless of whether the state was stored during simulation, by deriving the requested state from known states. For example, the simulation may be reset to a stored state that approximates the requested state, and the simulation may be run from the stored state using information obtained from the directed relationships. The simulation may proceed to the requested state.

Features described herein may provide a way to simulate a system that exhibits multiple patterns of behavior using states and directed relationships. Further, features described herein may allow a system state at an arbitrary simulation time to be efficiently retrieved using stored states and directed relationships, even if the requested state was not stored during an initial simulation of a model. These and other features are described in detail below.

FIG. 1 illustrates an example of a linear simulation of a model that may proceed through a number of states 110, 120, 130, 140 during the simulation. Suppose, for example, the system represented by the model is a ball rolling down a hill. State 110 may represent a time when the ball is at the top of the hill. State 120 may represent a time when the ball is halfway down the hill. State 130 may represent a time when the ball is at the bottom of the hill, and state 140 may represent a time when the ball has stopped rolling and reached an equilibrium state.

The states 110, 120, 130, 140, may have a number of parameters and values for describing the simulation of the model as represented by the state, for example, continuous-time and discrete-time state variables, discrete event states and their activity status, output variables of conditionally enabled model elements, solver variables, event status of the an event calendar, etc. It should be noted that the arrows in FIG. 1 are provided for the convenience of the reader. The arrows do not necessarily represent "directed relationships" between the states as described in more detail below, although directed relationships could be provided between the states in FIG. 1.

The simulation of the model represented in FIG. 1 may assume that the simulation proceeds in a linear manner. That is, the simulation may proceed from state 110 to state 120 to state 130 to state 140. There may be only one possible behavior of the ball when it is released at state 110, that is, the ball may be acted upon by certain forces and begin to roll down the hill, until the state of the system is represented at state 120.

However, in practice there may be a number of models that do not conform to the assumption that a simulation will proceed in a linear manner. For example, FIG. 2A depicts a system known as Galton's Board. A model of Galton's Board may exhibit branching behavior.

In a simulation of a model of Galton's Board, a ball 210 may be dropped until it reaches a peg, such as one of pegs 212, 214, 216. Upon reaching a peg, the ball can either fall left or fall right. Upon reaching the bottom of the system, the ball 210 falls into a bin, such as bin 220.

In a simulation of a system such as the one depicted in FIG. 2A, the ball 210 may follow two patterns of behavior when the ball 210 reaches a peg, such as peg 214. The ball 210 may either fall right towards peg 216 or fall left towards peg 218. Whether the ball 210 falls to the right or the left after the ball 210 strikes a peg may be assumed to be independent of a trajectory that the ball has followed to reach the peg. Thus, a ball may be equally likely to fall right or left from any peg. Because the ball can follow two or more behaviors at various points during the simulation, the system depicted in FIG. 2A may violate the assumption that the simulation will proceed linearly from any given point according to only a single pattern of behavior.

At any given time, the position of the ball along the x-axis 230 may be defined. An outcome of a simulation may be the bin that the ball falls into. Thus, a ball at position 0 at the end of the simulation may fall into the bin labeled "0;" a ball at position 2 at the end of the simulation may fall into the bin labeled "1," and so on.

Figure 2B:
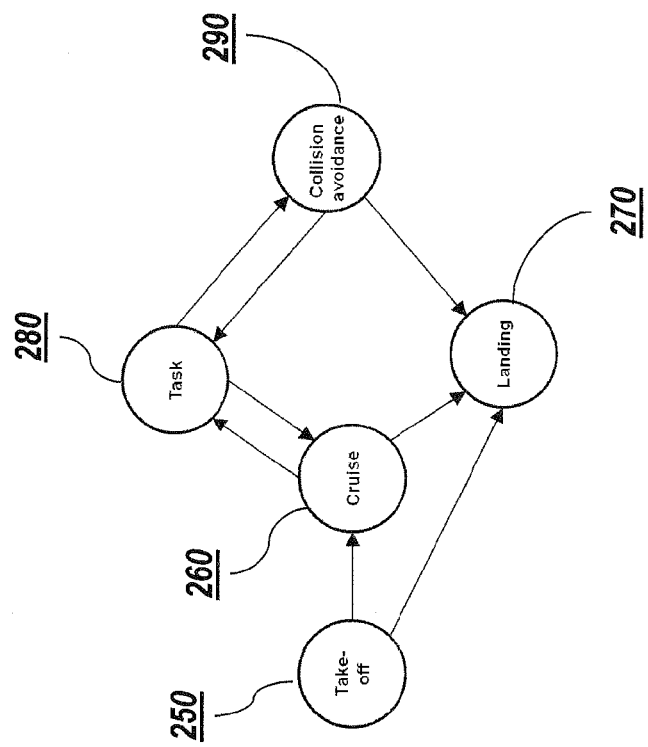
FIG. 2B illustrates a second example of a system that exhibits branching behavior.
Figure 2A:
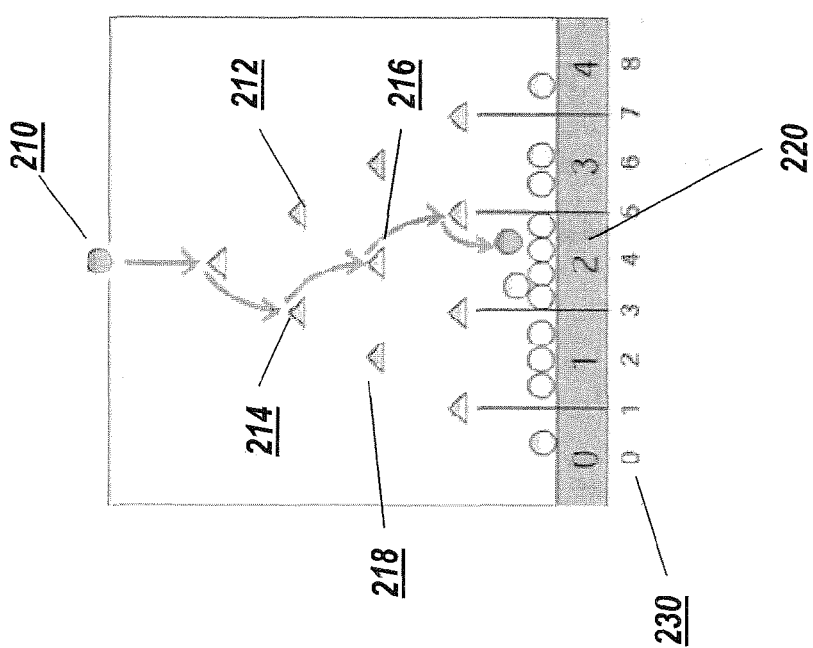
FIG. 2A illustrates a first example of a system that exhibits branching behavior.

FIG. 2B illustrates another example of a system that may exhibit branching behavior. Referring to FIG. 2B, a nondeterministic finite state machine (N-FSM) that may be used to model various aircraft simulation scenarios is depicted as a state transition diagram. For example, an aircraft may take off (state 250) and then execute one of two maneuvers. The aircraft may either cruise (state 260) or land (state 270). If the aircraft enters the cruising state 260, the aircraft may either land (state 270) or execute a task (state 280). If the aircraft executes a task (state 280), the aircraft may return to cruise (state 260) or make a collision avoidance maneuver (290). If a collision avoidance maneuver is executed, the aircraft may land (state 270) or execute a new task (state 280).

The current state of the system may determine which options are available to the aircraft. For example, if the aircraft performs a task (state 280), the aircraft may subsequently enter a cruising state (state 260) or perform a collision avoidance maneuver (state 290). The aircraft may not immediately land (state 270) after a task has been performed without first performing a collision avoidance maneuver (state 290) or entering the cruising state (state 260).

As can be seen in FIG. 2B, the aircraft may be capable of proceeding according to multiple patterns of behavior from a number of states. For example, from the "task" state 280, the aircraft may begin to cruise (first pattern of behavior) or may perform a collision avoidance maneuver (second pattern of behavior).

A model of a system such as depicted in FIGS. 2A-2B may proceed from one state according to two or more patterns of behavior and may be said to exhibit "branching" behavior. The branching behavior may be represented as a series of simulation states connected by directed relationships, as in FIG. 3A.

Figure 3B:
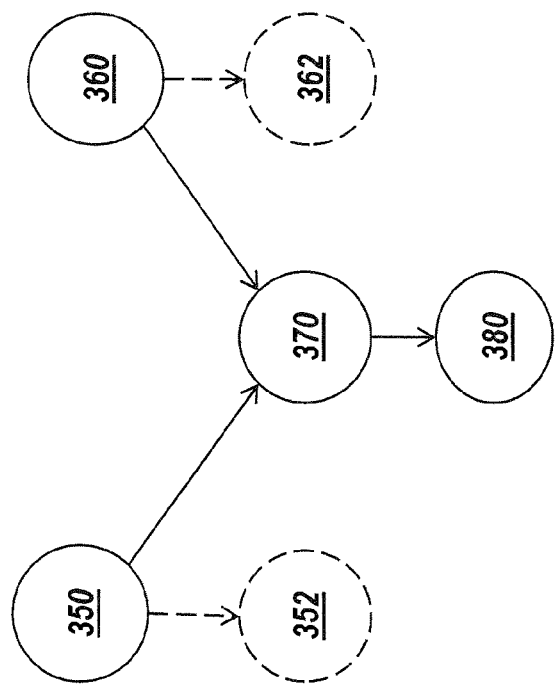
FIG. 3B depicts an example of merging two states after the branching performed in FIG. 3A.
Figure 3A:
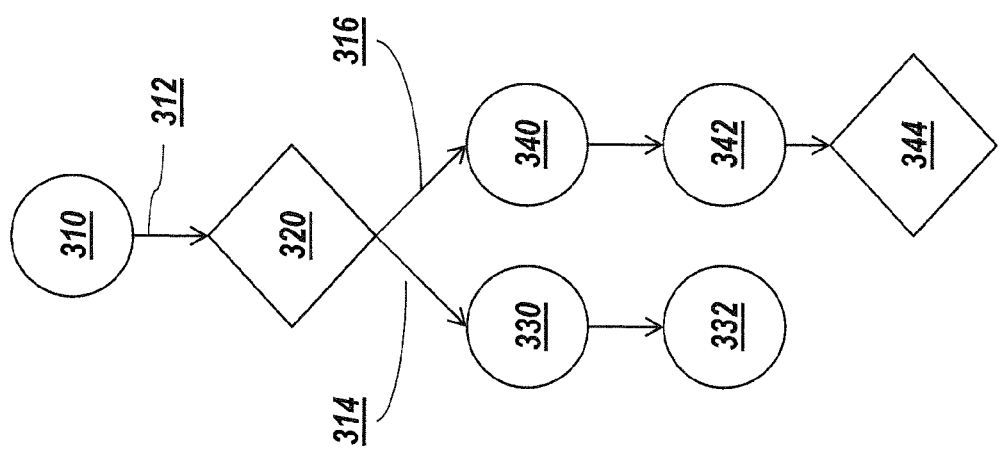
FIG. 3A depicts example states of a system during a branching simulation

FIG. 3A depicts states of a simulation during a branching behavior. For example, state 310 may represent the ball 210 (FIG. 2A) before the ball 210 hits peg 214. At state 310, the ball 210 may only follow a single pattern of behavior, that is, the ball 210 may follow a pull of gravity downwards towards peg 214 and a leftward momentum of the ball 210 (the ball 210 having fallen left of its previous bounce). An x-value 220 of the ball 210 in state 310 may be, for example, 3.1

State 320 may represent a branching state, from which the system may follow two or more different patterns of behavior. For example, state 320 may represent the ball 210 as the ball hits peg 214. The x-value of the ball 210 at state 320 may be, for example, 3. The ball may now either fall right (first pattern of behavior) towards peg 216, or may fall left (second pattern of behavior) towards peg 218.

Accordingly, to represent the two different patterns of behavior, the system may include a branch from state 320. The ball 210 may follow a first pattern of behavior to arrive at state 330, or may follow a second pattern of behavior to arrive at state 340. The x-value of the ball 210 in state 330 may be 3.1, while the x-value of the ball at state 340 may be 2.9.

The ball 210 may proceed according to the first pattern of behavior or the second pattern of behavior to arrive at new states. For example, following the first pattern of behavior from state 330, the ball 210 may be represented at a later time by state 332. Here, the x-value of the ball 210 may be, for example, 3.3. Following the second pattern of behavior from state 340, the ball 210 may be represented at a later time by state 342. Here, the x-value of the ball 210 at state 342 may be, for example, 2.5.

As can be seen, each of the states 330, 340 following a branched state 320 may represent possible alternative states for the system. By following each pattern of behavior to an end of the simulation, each of the possible outcomes of the simulation may be traced without needing to run multiple simulations under different assumptions.

State 344 may represent, for example, a time when ball 210 strikes pin 216. At state 344, the x-value of the ball 210 may be 4.0. The ball 210 may proceed from state 344 according to two different patterns of behavior. That is, the ball may fall right, or the ball may fall left. Accordingly, state 344 may be a branching state.

As can be seen above, the ball 210 may follow only one path through the simulation from state 340 to state 342 to state 344. States of a simulation may be stored as the simulation progresses. Intermediate states such as state 340 and state 342 may be identified. Such intermediate states may be states from which there may be only one possible pattern of behavior. Thus, until the simulation arrives at a subsequent branching state, only one outcome may be possible. For example, in FIG. 3A, after the simulation reaches state 340, the only possibility is that the simulation will continue to state 342 and state 344.

A simulation system running a simulation may decide when to store states using a number of different criteria. For example, the system may store states at regular intervals, such as regular time intervals. Alternatively, the system may store states when a certain triggering condition is met, such as when a branching state is reached or when a model or system variable reaches a specific value. The triggering condition may be predefined, or may be identified by a user. A user may also manually instruct the system to store a state.

A simulation system running a simulation may choose not to store one or more intermediate states during the simulation. Alternatively, the system may store each state and then analyze the stored states to determine whether the stored state is an intermediate state. The system may then eliminate one or more intermediate states from memory. For example, the system may choose to eliminate one or more of states 340 and 342 in FIG. 3A.

FIG. 3A also depicts directed relationships 312, 314, 316. A directed relationship between a first state and a second state may represent a change of the state of the simulation between the first state and the second state. For example, a model may be associated with a number of equations that describe its behavior. The equations may accept input values representative of a first state of the simulation and generate output values representative of a second state of the simulation. A directed relationship between a first state and a second state may indicate that, by using values for the parameters defined in the first state, the output of the equations may represent the respective values for parameters in the second state in the simulation. A directed relationship may include information that may describe how one state evolves into another. For example, a directed relationship may include instructions or equations that may be applied to a predecessor or parent state to arrive at a successor or child state.

A directed relationship may be used to indicate a forward or backward relationship between states with respect to a reference parameter, such as time or an index value represented in an ordered or partially ordered index. For example, a directed relationship may show a change from an earlier state into a later state, or a later state into an earlier state. Directed relationships 312, 314, and 316 may allow states of the simulation, represented in FIG. 3A, to be derived. For example, if it is known that states 310 and 320 are connected by a directed relationship 312, then by using state 310 as a starting state and applying equations related to a model, it may be possible to arrive at state 320. Further, it may be possible to arrive at intermediate states between states 310 and 320 without having stored the intermediate states.

In some cases, two alternative states may be equivalent. For example, FIG. 3B illustrates an example where two alternative states are an equivalent (i.e., state 352). In this case, the equivalent states may be merged into a single state.

For example, state 350 may represent a state of the simulation, depicted in FIG. 2A, after the ball 210 has fallen to the right from peg 214. The x-value of the ball 210 at state 350 may be 3.2. Likewise, for example, state 360 may represent a state of the simulation after the ball 210 has fallen to the left from peg 212. Here, the x-value of the ball 210 at state 360 may be 4.8. In both cases, the ball 210 is falling towards peg 216, albeit along different trajectories.

State 352 may represent a time when the ball 210, having fallen to the right from peg 214, strikes the center of peg 216. Similarly, state 362 may represent a time when the ball 210, having fallen to the left from peg 212, strikes the center of peg 216. Thus, at both states 352 and 362, the x-value of the ball 210 may be 4.0. It can be seen that, regardless of which path the ball 210 followed to arrive at states 352 and 362, the ball 210 is in the same position and can follow the same patterns of behavior from states 352 and 362. Thus, states 352 and 362 may be said to be equivalent.

States may be determined to be equivalent in a number of ways. For example, suppose two states of the simulation depicted in FIG. 2A are associated with two parameters, a time and an x-value of ball 210. If the values of these parameters are the same for both states, the states may be determined to be equivalent. Alternatively, if the values of these parameters are not equivalent, but are within a predetermined tolerance of each other, the two states may, likewise, be determined to be equivalent.

Two states may be determined to be equivalent if a subset of values of parameters associated with the states are the same. The subset may be a subset of parameters which may affect an outcome of the simulation. For example, in the system depicted in FIG. 2A, the state of the related simulation may include information about a position of ball 210 along an x-axis 230, a current simulation time, and a color of ball 210. If the color of ball 210 does not affect an outcome of the simulation, then only the position of the ball and the simulation time may be considered when determining if two states are equivalent for purposes of the simulation.

Whether or not a parameter may affect an outcome of a simulation may be determined in a number of ways. For example, if possible outcomes of a simulation starting at state 352 match possible outcomes of a simulation starting at state 362, then states 352 and 362 may be said to be equivalent. Thus, two states may be identified as being equivalent if an outcome of simulating one of the states is equivalent to an outcome of simulating the other state.

Differencing is a technique that may be used for determining whether two models or states are equivalent. Differencing may involve comparing two models or two states on a structural level in order to determine if differences exist between the models or states. If no differences exist, then the models or states may be deemed equivalent. Two states that are deemed equivalent may be merged.

Another technique may involve checksumming. Here, a checksum may be calculated for each state in a model. If the checksums for two states are equal, the states may be determined to be equivalent.

One example of a checksumming algorithm is the MD5 algorithm. In one embodiment, an object representing a simulation state of the model may be stored, and the object may include one or more numeric values. Some or all of the numeric values may be added to a stream. The MD5 checksum algorithm may accept the stream as an input and generate a 128-bit signature of the simulation state. If two states have the same signatures, the two states may be deemed to be equivalent.

If two states are deemed to be equivalent, then the two states may be merged. For example, in FIG. 3B, equivalent states 352 and 362 are merged into state 370. There are a number of ways to merge two states. For example, one of the two states 352, 362 may be selected to become the new merged state, and the other state may be abandoned. This approach may be suitable if the two states are exactly equivalent, and thus there may be no reason to favor one state or the other. Another technique may be to make a copy of one of the states and use the copy as the merged state.

Another technique may involve presenting two states to be merged to a user in a user interface and allowing the user to select which state or which parts of each state should be used going forward in the simulation. This technique may be preferable when the two states are not exactly equivalent, but the decision to merge has nonetheless been made. Another technique for merging two states may involve creating a new state using an average of parameter values for the states being merged. Another technique may use an average of parameter values of parts of each state while other parts may use parameter values of each state.

When two states are merged, directed relationships entering and leaving the merged state may be updated. For example, in FIG. 3B, a directed relationship existed between states 350 and 352, and another directed relationship existed between states 360 and 362. When states 352 and 362 are merged into merged state 370, the directed relationships are updated so that new directed relationships are established between states 350 and 370, and states 360 and 370.

After two states are merged, the simulation may proceed using the merged state as a new initial state. For example, in FIG. 3B, the simulation proceeds from merged state 370 to the next state 380.

In other branching behavior, given, for example, an event occurs, a condition takes on a certain value, or a user provides certain input, a model may consist of partitions that can be simulated separately. Each of the model partitions may cause different patterns of behavior. The simulation may branch into different states in order to simulate the different patterns of behavior, and the states may merge if and/or when the partitions join together to operate as a unit.

For example, in a simulation of a mechanical driveline, a clutch of the driveline that opens may create two independent driveline parts that can be simulated separately. The independence may vary in degrees, where there may be no relation between the parts or where certain variables, for example, time, are shared. In case of shared variables, synchronization may be used when the model parts are combined again, for example when the clutch closes. In another example, a simulation of unloading and loading of a truck at a manufacturing plant may include pallets being removed from the truck, cleared, loaded, and reloaded on the truck. In simulation the simulation state may be branched when the truck is unloaded and the individual pallets may be simulated separately (for example, in a discrete event simulation based on an entity flow network model). The simulations may then merge again when the pallets are reloaded on the truck and their time stamp may be synchronized with the time of reloading.

When, for example, an event occurs, a condition takes a certain value, or a user provides certain input, the simulation state may be a branching point for separate simulations. Each of these simulations may affect only a partition of the simulation state at the branching point and so they may advance only part of the simulation state at the branching point. The separate partitions of the simulation state may be stored in separate data structures.

Figure 4A:
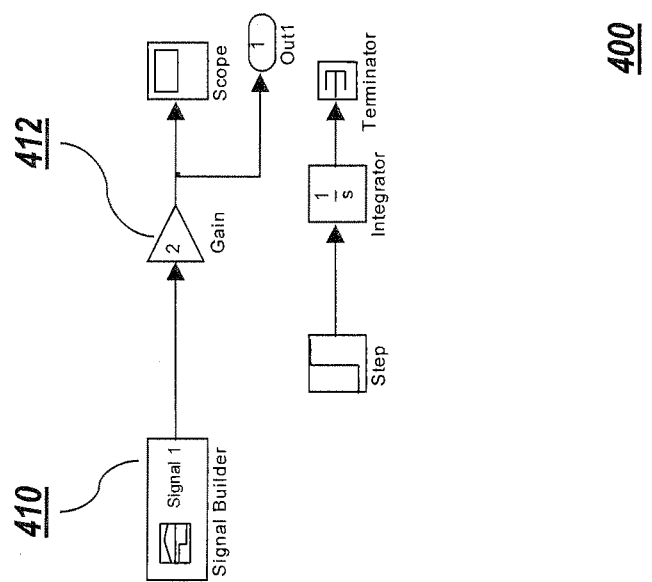
FIG. 4A illustrates an exemplary block diagram model employing a block 410 that exhibits temporal branching behavior.

When, for example, an event occurs, a condition takes a certain value, or a user provides certain input, the separate simulation states may be merged. These separate simulation states may capture mutually exclusive model parameter values, and the merge does not require any further modification of these values to arrive at a merged simulation state. The separate simulation states may also capture model parameter values that differ and a merge may result in modifying these values to arrive at consistent merged values. For example, when a clutch between two rotational inertias closes, in case of an ideally rigid connection, their respective angular velocities may merge into one angular velocity of both of the inertias. The merged angular velocity may be derived from the separate angular velocities, further model parameters, and computations such as conservation of angular momentum. The branching and merging behavior depicted in FIGS. 3A-3B may result from a number of different causes. For example, FIG. 4A depicts a block diagram model 400 employing a block 410 that exhibits temporal branching behavior. Conditional branching behavior will be discussed with reference to FIGS. 5A-5C, below.

The model 400 depicted in FIG. 4A uses a signal builder block 410, which may be used to define temporal branching behavior. In a temporally-branching simulation system, simulation may branch into two or more states at predefined points in time. In the model 400, a signal may be generated by the signal builder block 410 and provided to the gain block 412 at multiple simulation times during a simulation of the model 400. The particular pattern of signal output by the signal builder block 410 may be determined by a current simulation time; thus, the signal builder block 410 may exhibit multiple behaviors depending on the current simulation time.

Figure 4B:
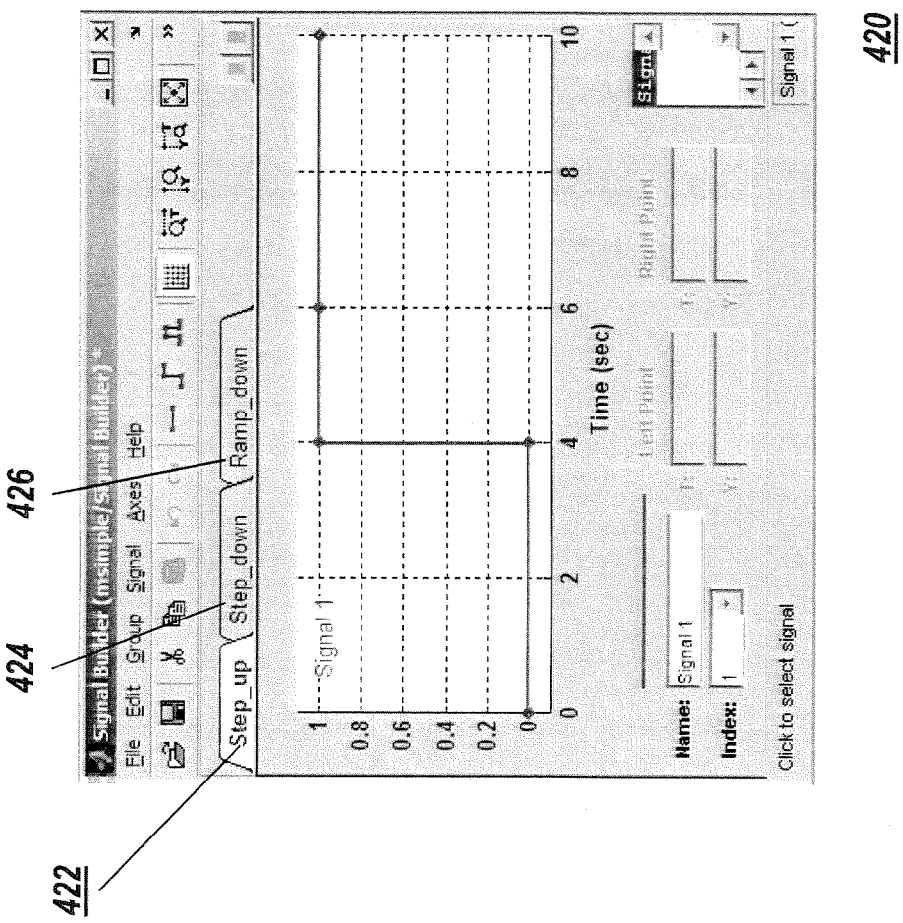
FIG. 4B illustrates an exemplary interface 420 that may be used for configuring the block 410 of FIG. 4A.

A user may configure how and when the simulation branches using a dialog, such as the signal builder dialog 420 depicted in FIG. 4B. In the signal builder dialog 420, a user may open a signal transition editor which may allow the user to specify a transition between signals. For example, in the signal builder dialog 420, the user is presented with a step_up tab 422, a step_down tab 424, and a ramp_down tab 426. The user may use these different options to specify how a signal named "Signal 1" behaves at different simulation times.

Figure 4C:
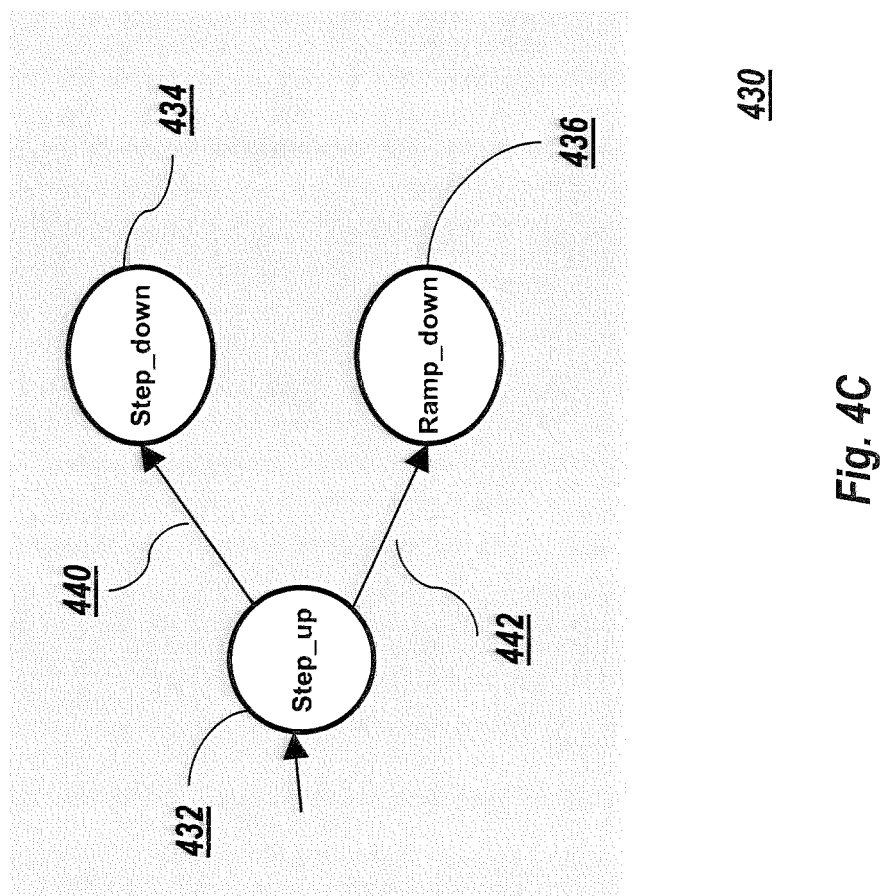
FIG. 4C illustrates an example of a state diagram that may be generated based on the input to the interface 420 of FIG. 4B.

The signal transition editor may generate nodes representing characteristics of the signals in the tables 422, 424, 426. For example, as shown in FIG. 4C, the signal transition editor generates a step up node 432, a step down node 434, and a ramp down node 436. The user may choose one of the nodes (step up node 432, in this case) as an initial signal or initial characteristic of the signal. The user may connect the nodes as a state machine having transitions (such as transitions 440, 442) in order to specify how the signal changes over time. For example, in the state diagram 430 depicted in FIG. 4C, the user may specify that the step up node 432 is an initial node, and that from the step up node 432, the signal may either step down by transitioning via transition 440 to the step down node 434, or ramp down by transitioning via transition 442 to the ramp down node 436.

Figure 4D:
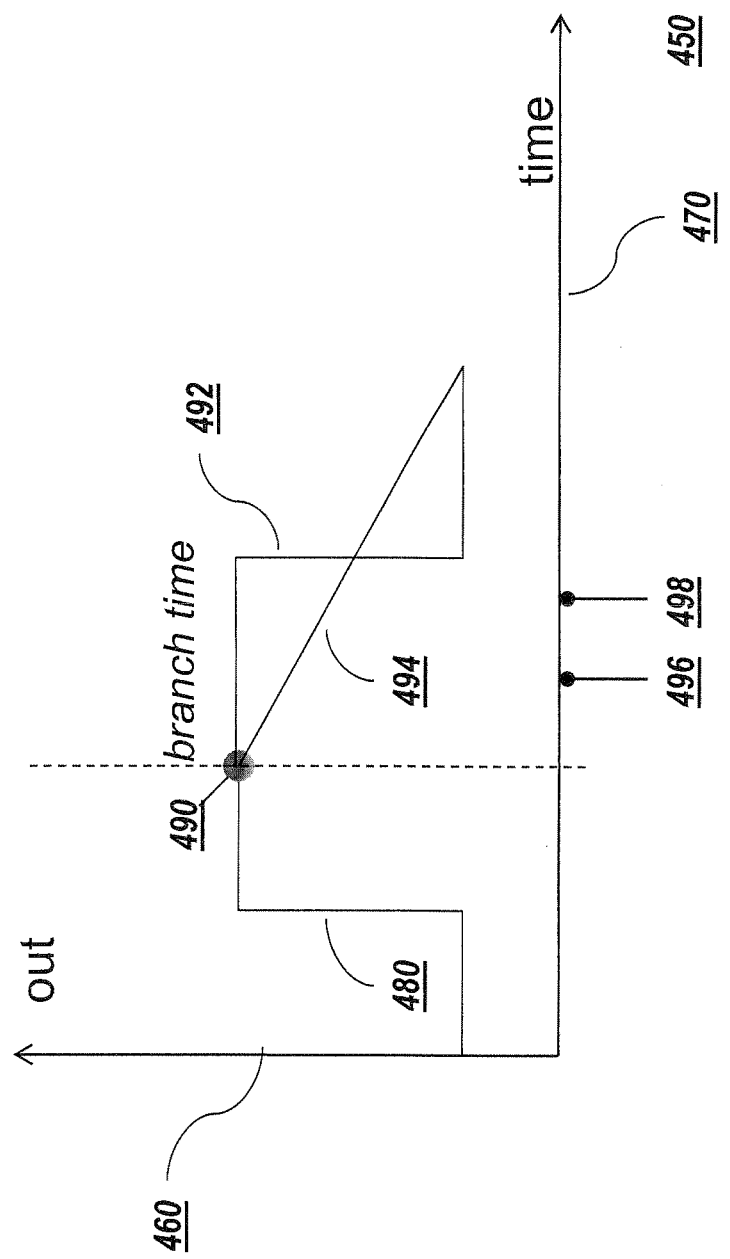
FIG. 4D depicts an example of an output of the block 410 of FIG. 4A over time.

FIG. 4D depicts an output 450 of the block 410 of FIG. 4A over time. The output of the block 410 may be a signal that may be represented on an output axis 460 over a period of time depicted on a time axis 450. The signal may initially exhibit step_up behavior 480, which may be consistent with an initial state of the simulation being defined as the step up state 432. When the simulation reaches a branching time 490, the simulation system may follow two different behaviors, i.e., the signal may exhibit a step down behavior 492 consistent with the step down node 434, or the signal may exhibit a ramp down behavior 494 consistent with the ramp down node 436.

When the model 400 is simulated, the above behaviors may be simulated. For example, the step up behavior 480 may be simulated up to the branching time, and then the step down behavior 492 and the ramp down behavior 494 may be simulated.

The simulation may proceed in a consecutive manner. Here, each possible branching behavior may be determined, and a first branch may be fully simulated before the simulation begins to simulate a second branch. For example, in FIG. 4D, the simulation system may begin at the branching time 490 and fully simulate the step down behavior 492 until the end of the simulation, and then return to the branching time 490 and fully simulate the ramp down behavior 494.

The simulation may proceed in an unordered manner. Here, different branching behaviors may be simulated together. For example, in FIG. 4D, the simulation system may begin at branching time 490 and simulate the step down behavior 492 until simulation time 496. The system may then return to the branching time 490 and simulate the ramp down behavior 494 until the simulation time 496. The system may then return to the step down behavior 492 and simulate the step down behavior 492 from time 496 until time 498. The system may then return to the simulation time 496 and simulate the ramp down behavior 494 until simulation time 498, and so on until the end of the simulation.

Note that the above simulations may be performed in parallel. For example, a computing system performing the simulation may include multiple processors and/or multiple cores within or among processors. Here, the different branching behaviors may each be simulated simultaneously on separate processors. The simulation state may be stored in computer architecture independent format and the separate processors may be part of different computer architectures.

Also note that the above simulations may be performed in a breadth-first manner, as described for FIG. 4D. The simulation may also be performed in a depth-first manner where the simulation system may begin at branching time 490 and simulate the step down behavior 492 until simulation time 496. The system may then save the simulation state and simulate the step down behavior 492 from time 496 until time 498. The system may then return to the branching time 490 and simulate the ramp down behavior 494 until the simulation time 496 and save the state. The system may then simulate the ramp down behavior 494 from the simulation time 496 until simulation time 498.

Note that the simulations may be performed in yet other manners, such as based on heuristics for graph searches, for example, by adorning branching points or state saving points in the simulation with attributes such as a cost. Also note that combinations of different manners may be employed before the end of the simulation.

Temporal branching behavior, such as the temporal branching behavior described with respect to FIGS. 4A-4D, is one type of branching behavior. Other, branching behaviors may be defined with respect to one or more conditions which, if met, cause the system to branch. For example, FIG. 5A illustrates an exemplary model structure 500 for a model exhibiting conditional branching behavior.

Figure 5A:
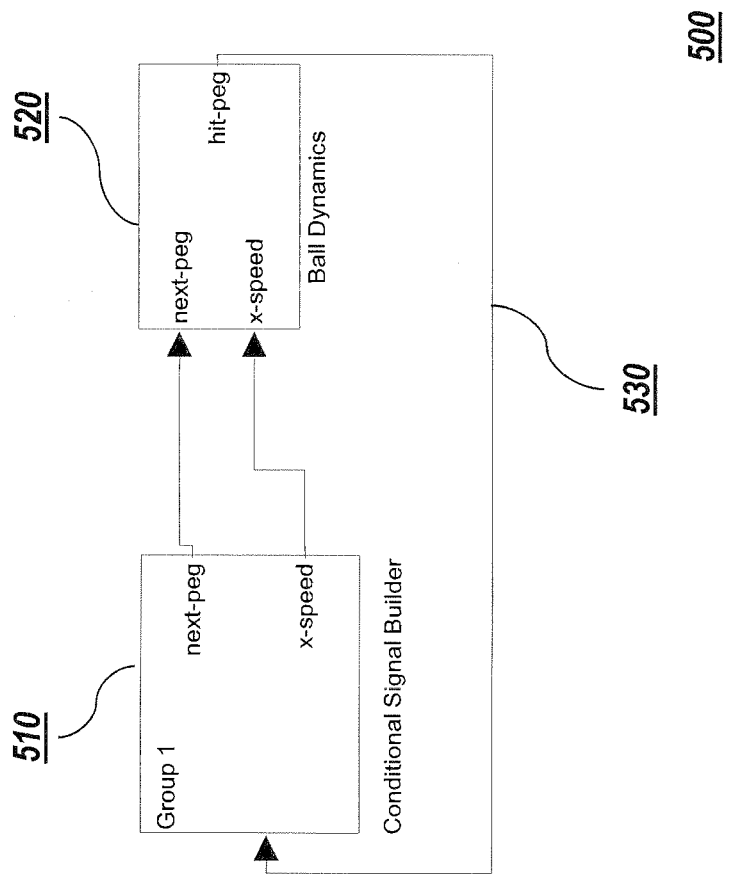
FIG. 5A illustrates an exemplary model structure that may be used for a model exhibiting conditional branching behavior.

Referring to FIG. 5A, model structure 500 includes a conditional signal builder block 510 and a model 520. The model 520 may create an output which may describe a branch condition 530. The branch condition 530 may be used as an input to the conditional signal builder block 510 to determine whether or how the system should branch. The model structure 500 may include a model such as exemplary model 540 in FIG. 5B.

Model 540 may be used to model the system depicted in FIG. 2A. In model 540, two integrators 542, 544 may model the horizontal and vertical position of ball 210. The inputs to the model 540 may be used either as a regular signal (represented by, for example, an action block) or as a condition for branching (represented, for example, by a guard block).

Figure 5B:
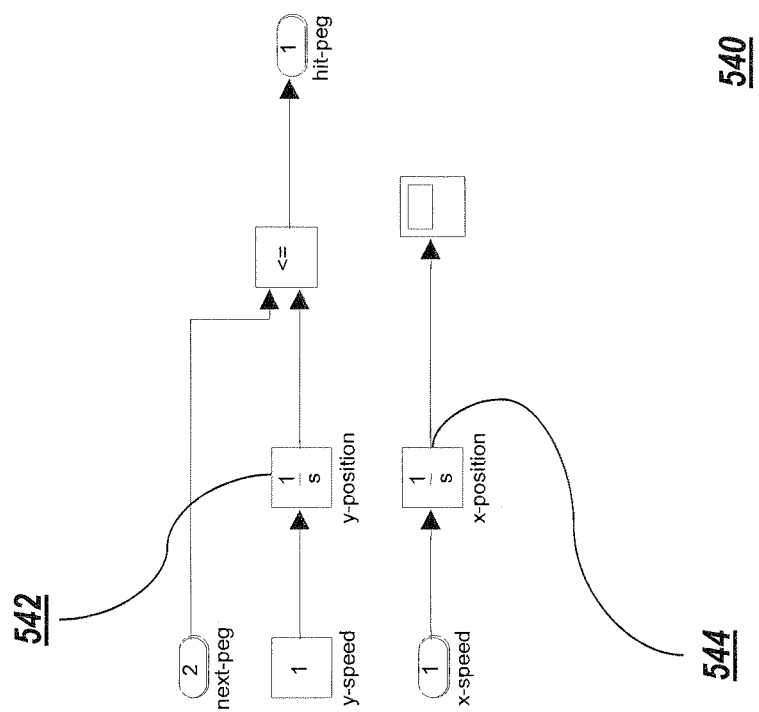
FIG. 5B illustrates an exemplary model employing conditional branching behavior.
Figure 5C:
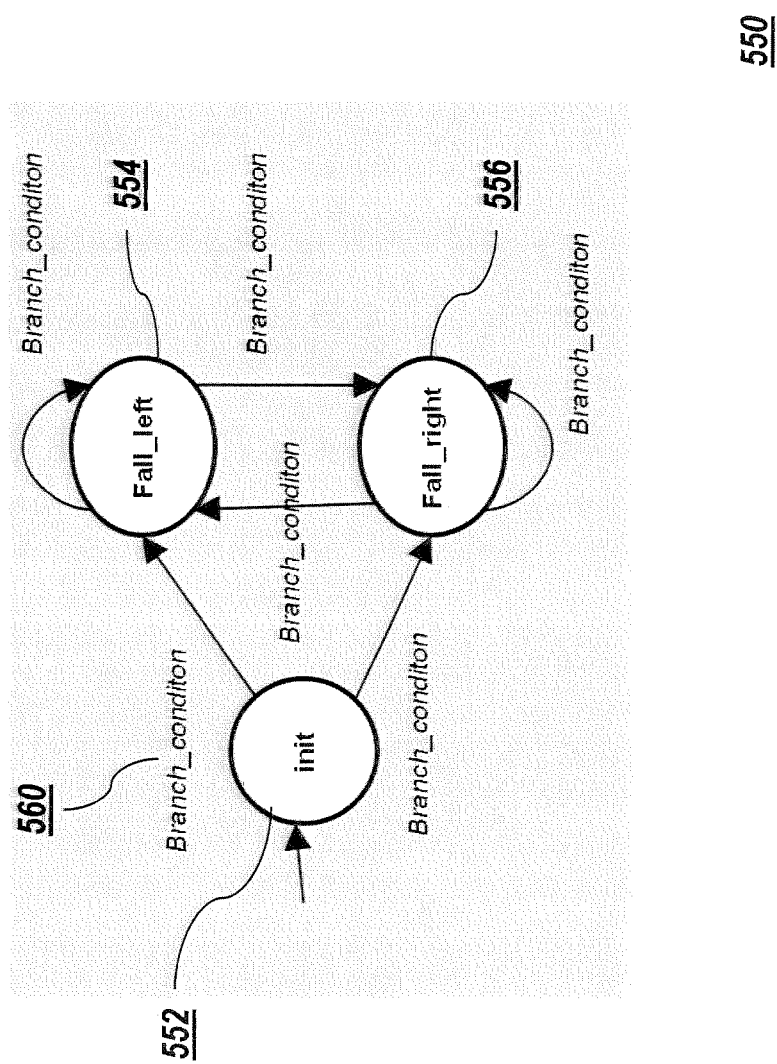
FIG. 5C illustrates an example of a state diagram of a model exhibiting conditional branching behavior based on the system depicted in FIG. 2A.

The model structure 500 may include a conditional signal builder, such as a state diagram 550 in FIG. 5C which may define a conditional branching behavior of the simulation. For example, ball 210 may begin at state 552 and proceed according to at least two behaviors. For example, depending on whether the branch_condition 560 is satisfied, ball 210 may either fall left as represented by state 554, or fall right as represented by state 556. The branch_condition 560 may be, for example, a boolean value which if set to "TRUE" may cause the ball 210 to fall left and if set to "FALSE" may cause the ball to fall right. Alternatively, the branch_condition 560 may be set to "TRUE" to cause the ball 210 to fall both left and right and the simulation may branch at this point.

The simulation state in states 552, 554, 556 may be logged and their relations may be stored in a directed graph object. In addition, a visualization of a simulation log may be displayed, as will be discussed in more detail with respect to FIG. 7.

The behavior of the Conditional Signal Generator 510 of FIG. 5A may be modeled as the nondeterministic finite state transition system in FIG. 5C. The Conditional Signal Generator 510 models the switching of falling directions that may be nondeterministic (e.g., falling left in state 554 and falling right in state 556) when the ball hits the pegs.

The input to the Conditional Signal Generator 510 may be a branch condition 560 that becomes TRUE when the ball hits a peg. Note that the branch condition 560 may also describe a condition when the simulation may be branched.

In any state, the Conditional Signal Generator 510 may output two constant signals. One of the constant signals is the next position of the peg, and the other constant signal is the x-speed of the ball.

When the branch condition 560 evaluates to TRUE, the Conditional Signal Generator 510 may make a transition to a different state, which gives another pair of output signals. Initially the Conditional Signal Generator 510 starts in an init state 552. Once the branch condition becomes TRUE (the ball hits a peg), the logic of the block makes a transition either to the FALL-LEFT state 554 or the FALL-RIGHT state 556, which then determines the x-speed and the next peg position to hit.

When the ball hits a peg again, it may make a transition to the same location (falling in the same direction) or make a transition to the opposite location (falling in the opposite direction.)

Figure 6:
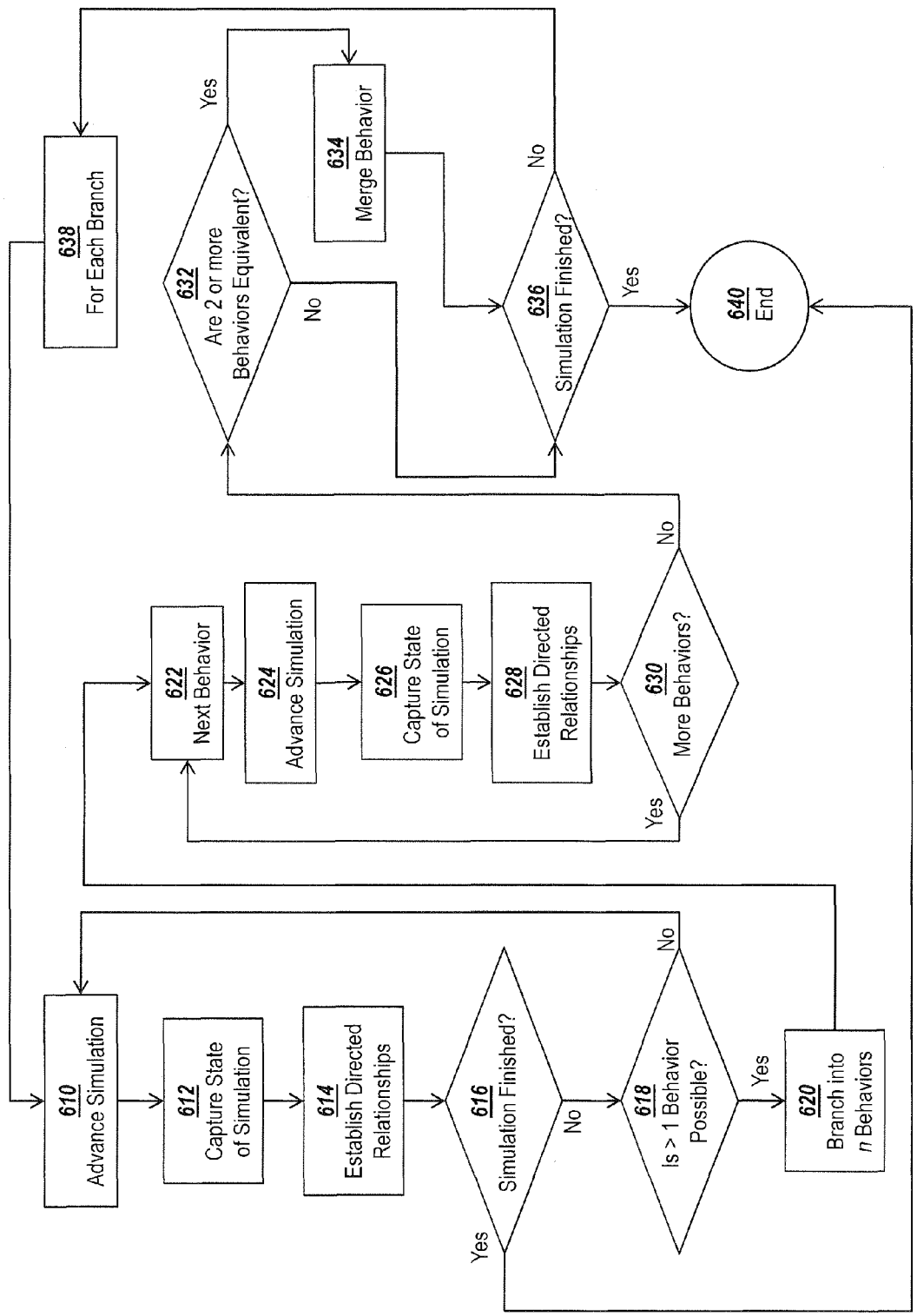
FIG. 6 illustrates an example of a flowchart of exemplary acts that may be used to practice one or more embodiments of the invention.

FIG. 6 illustrates an example of a flowchart of exemplary acts that may be used to practice one or more embodiments of the invention. Referring to FIG. 6, at block 610, a simulation is either begun, if the simulation has not been previously started, or advanced if the simulation had been previously started. The simulation may begin or advance with a state of a model simulation having one or more values for one or more parameters. The simulation may apply one or more equations, using the values for the parameters as inputs, to derive one or more outputs representative of a next state of the simulation.

The model may be a continuous model, such that the simulation may advance continuously. An example of a continuous model may be a time-based model that may advance to a new state as a function of simulation time.

The model may be a discrete model where the simulation advances in discrete steps or intervals. The discrete steps or intervals may be determined during simulation, predetermined, or may be user defined. An example of a discrete model is an event-based model that may advance to a new state upon an occurrence of a discrete event. The discrete steps may represent time or may be an ordered or partially ordered sequence of indices such as the natural numbers.

The model may be a hybrid discrete-continuous model. Here, the system may advance continuously for a period of time, and then according to discrete intervals for a period of time, or vice-versa. Certain portions of the model may be defined so as to advance during simulation in a continuous manner while other portions of the model simultaneously advance in a discrete manner during simulation.

For a hybrid discrete-continuous model, if the model includes a time-based component that advances in a continuous manner and a state diagram model that responds to events, the events referenced by the state diagram model may not be the same when the model is restored as when the model was initially run. These events may be kept in, for example, one or more event calendars. Accordingly, if it is determined that the model includes a discrete portion, the discrete portion may be saved or initialized when the simulation state is stored or restored.

At block 612, a state of a simulation of the model may be captured. The state of the simulation may be captured in a number of ways. For example, an area of memory representing the state of the simulation may be registered and preserved.

At block 614, a directed relationship may be established between two or more states. For example, if a new state was captured at block 612, directed relationships may be established to and/or from the new state. Likewise, for example, a directed relationship may be established by determining (1) whether a state was derived from another state (e.g., a child state derived from a parent state) or (2) the state could have been derived from another state.

If the model is a continuous or hybrid model, the directed relationship may be representative of a temporal relationship (e.g., a first state occurs before a second state in time).

The directed relationship may be represented, for example, as a relationship identifying one state as a predecessor state and a second state as a successor state. For example, a directed relationship from a state S1 to a state S2 may be represented as a pair where the first state is the predecessor state and the second state is the successor state, e.g. (S1, S2). Note that, directed relationships among multiple states may be represented as an array or matrix identifying relationships between states.

At block 616, it is determined whether the simulation is finished. The simulation may be finished, for example, when the simulation time reaches a predetermined stopping time or based on user interaction. Alternatively, one or more ending conditions may be set which, if achieved, end the simulation. It should be noted that, if multiple branches exist in the simulation, each branch may be simulated to the appropriate end time or ending condition.

If multiple patterns of behavior are simulated (see, e.g., block 620 below), it may be determined that the simulation is finished when one of the patterns of behavior causes the simulation to reach a predetermined criterion. The predetermined criterion may be, for example, a predetermined simulation time or a predetermined value for one of the variables represented in the simulation state.

The simulation state which meets the predetermined criterion may be referred to as an acceptance point. The acceptance point may be used as a final outcome of the simulation. Alternatively, the acceptance point may be used as a new initial state, and simulation may proceed from that point according to the techniques described in FIG. 6. Any parallel simulations may be terminated and the simulation may proceed from the acceptance point. Accordingly, a user may perform a design exploration at an arbitrary point of simulation state and pick and choose which design choice fits predetermined simulation goals.

If it is determined that the simulation has finished, at block 640 the simulation ends. If any parallel simulations are being run (see, e.g., block 620), the parallel simulations may be terminated. If it is determined that simulation has not finished, at block 618, it is determined whether the model may be simulated according to more than one pattern of behavior, that is, it is determined whether the simulation may branch from the current state. The simulation may branch, for example, in response to an input received from a user specifying that the model is to be simulated in at least two different ways. The input may specify, for example, a simulation time from which the model is to be simulated in the at least the two different ways. Alternatively, the input may specify one or more conditions which, if met, cause the model to be simulated in at least two different ways. The simulation may also branch based on the model time, such as illustrated in FIGS. 4A-4D, or when certain conditions are present, such as illustrated in FIGS. 5A-5C.

If it is determined at block 618 that only a single behavior is possible, processing returns to block 610 and the simulation may advance in a linear manner. If it is determined at block 618 that n behaviors may be possible, where n>1, at block 620, the simulation may branch into n behaviors, where n may correspond to a number of different behaviors that may be possible from the previous state of the system. For example, at state 320 in FIG. 3A, the simulation may branch into two different patterns of behavior. In an embodiment, each pattern of behavior may be simulated in a new simulation, which may be run using different solvers. The new simulations may be run in parallel At block 622, the simulation selects the next available behavior. At block 624-626, the simulation advances according to the behavior selected at block 622. Blocks 624-626 generally correspond to blocks 610-614 and are preformed in a similar manner.

At block 628, directed relationships are established from a parent state determined at block 612 and any child states that may have been established at block 626. For example, if a first state of the system is captured at block 612, and two additional states (a second state and a third state) are captured at block 626 (as will be described below, block 626 may be part of a loop that may be executed n times, where n is the number of different behaviors which may be followed from the first state), then a first directed relationship may be established from the first state to the second state, and a second directed relationship may be established between the first state and the third state.

At block 630, it is determined whether additional behaviors remain to be simulated. If additional behaviors remain to be simulated, the simulation returns to block 622 and selects the next behavior for simulation. If no additional behaviors remain to be simulated, then at block 632 it is determined whether any two or more of the states which have been established are equivalent. Equivalence may be determined as described above. Here, each of the states of the simulation may be compared to determine equivalence. For example, a state that was recently captured may be equivalent to a state captured much earlier in the simulation. Thus, recently generated states may be compared to each previous state in the simulation.

Recently generated states (for example, states captured during a recent iteration through the loop defined by steps 622-630) may be compared to each other. This may allow resources to be conserved, particularly in the case of a breadth-first simulation. For example, in some situations, it may be the case that two states may be considered equivalent if the two states occur at the same simulation time. If a breadth-first simulation is used, then multiple states may be generated in close succession, all sharing the same simulation time. In order to conserve system resources, states occurring at the same simulation time may be selected for comparison to determine whether the states are equivalent.

If it is determined at block 632 that no two states are equivalent, processing proceeds to block 636. Block 636 generally corresponds to block 616.

If it is determined at block 632 that at least two states are equivalent, processing proceeds to block 634 and the equivalent states are merged, such as described above. The simulation may then proceed to block 638 where the simulation may be advanced for each branch.

Note that the acts depicted in, FIG. 6 illustrate an example of a depth-first simulation, in which a pattern of behavior may be fully simulated before moving on to a next behavior. However, it should be noted that simulation may also proceed in a breadth-first manner. An example of a bread-first technique that may be used was described above with respect to FIG. 4D.

At block 636, a user may be presented with a choice of simulating from a selected state. For example, if it is determined in block 618 that two behaviors may be possible, and the simulation may advance to a second state or a third state, a user may be presented with a choice that enables the user to select advancing to the second state or the third state. The user may select the second state or the third state as a new initial state, and the simulation may advance to the selected state and may then proceed from the selected state. Here, the non-selected pattern of behavior need not be simulated if a user is not interested in the non-selected pattern of behavior.

At a point during a simulation, information may be stored. The stored information may allow one or more states and one or more directed relationships to be restored. For example, if a system includes an initial state and an intermediate state connected by a directed relationship, the entire initial state of the system, the entire intermediate state of the system, and the entire directed relationship of the system may be stored. Alternatively, the intermediate state may not be stored and instead the initial state and the directed relationship may be stored. The intermediate state may be derived from the stored initial state and the directed relationship. Note that the entire initial state of a system need not be stored if certain portions of the initial state do not affect an outcome of a simulation of the system. Further, portions of states which affect an outcome of a simulation may be stored.

At block 640, the simulation is ended. If an outcome of the simulation has been determined, the outcome may be presented, for example, to a user. If multiple outcomes of the simulation have been determined, the outcomes may be presented as a graph. An example of such a graph is depicted in FIG. 7.

Figure 7:
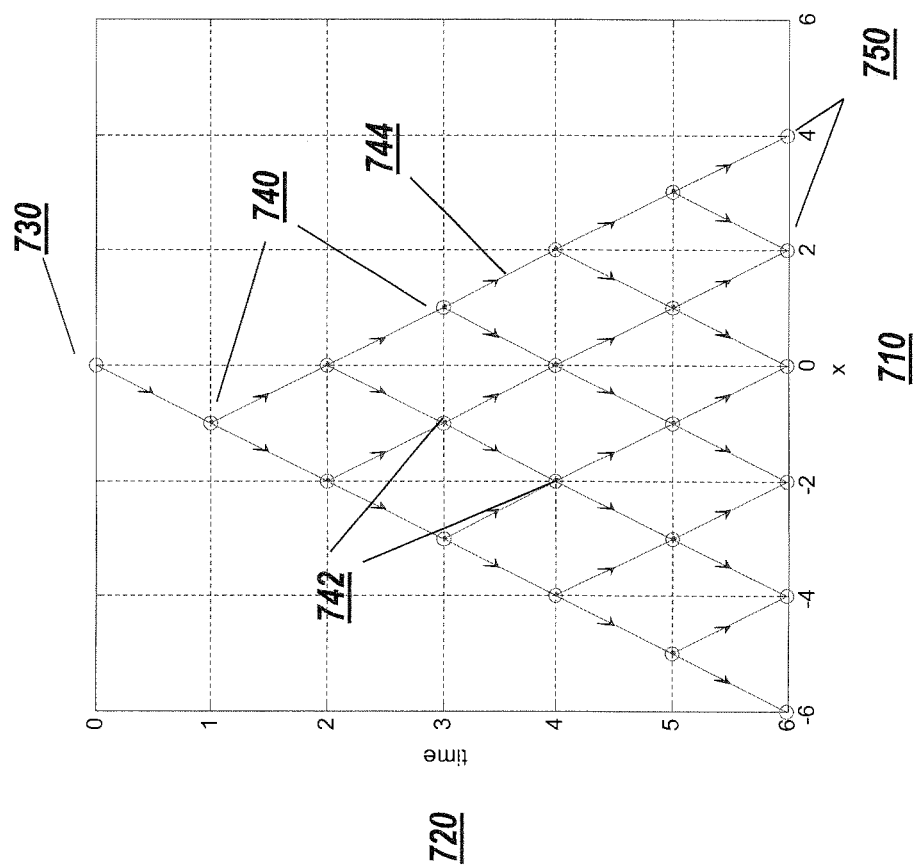
FIG. 7 depicts an example of an output graph showing a state of the system depicted in FIG. 2A over time.

Referring to FIG. 7, an output graph 700 shows a simulation state of a model representing a system similar to the one depicted in FIG. 2A, over time. The output graph 700 may depict an x-value of a position of ball 210 on x-axis 710. The simulation time may be depicted on y-axis 720.

The output graph 700 may depict an initial state 730 of the system. The initial state may represent the system at a time when the ball 210 is at a position designated by x=0. Note that an output graph may depict a single initial state 730. After the initial state 730, output graph 700 shows that the simulation may branch. As shown in the output graph 700, this particular simulation branches at regular intervals (1 second).

As the simulation proceeds it may pass through a number of states 740. It should be noted that states 740 includes intermediate states from which it is possible to branch (i.e., branching states). In practice, it may be possible that a number of other intermediate states between the branching states 740 may also be present in the output graph.

The output graph may include a number of merged states 742. The merged states 742 may have been derived from two or more states that were determined to be equivalent during a simulation and/or during an analysis following the simulation.

The states 740 may be connected by a number of directed lines 744. The directed lines 744 may be representative of directed relationships between the states 740.

At the bottom of the graph 700, a number of final states 750 may be represented. The final states 750 may represent final outcomes of the simulation based on end values (in this case, the final x-values) for each branch of the simulation.

After a simulation is finished, a user may wish to restore the simulation to a particular state in order to examine that state, or in order to use the requested state as an initial state for further simulation. The simulation states and directed relationships may allow the system to be restored to a particular requested state. If the requested state has not been saved, the requested state may be derived, for example, by interpolating between two saved states and/or simulating from a known state.

Figure 8:
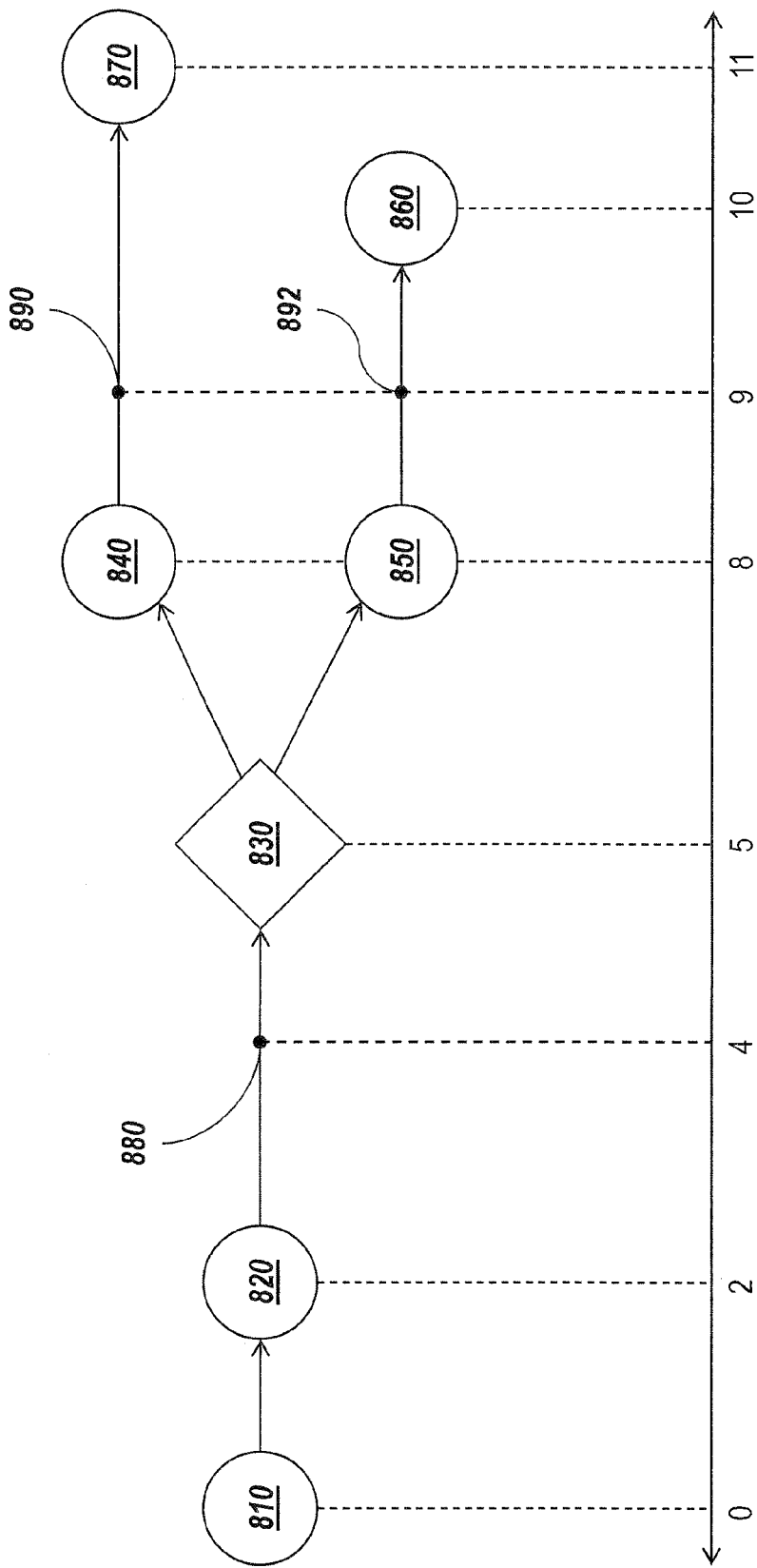
FIG. 8 depicts an example of interpolations between states of a system stored during a simulation that exhibits branching behavior.

FIG. 8 depicts deriving a state that is between states stored during a simulation that exhibits branching behavior. Referring to FIG. 8, an initial state 810 was stored at time zero. At time two, another state 820 may be stored, and at time five a third state 830 may be stored. The third state 830 may be a branching state from which two different patterns of behavior may be possible. Accordingly, the simulation may branch at time five and two successor states 840, 850 to the third state 830 may be captured at time eight. State 840 may represent a state when simulated from state 830 according to a first pattern of behavior. State 850 may represent a state of the system when simulated from state 830 according to a second pattern of behavior.

State 860 may represent a state of the system at time ten, if the system is simulated from state 830 according to the second pattern of behavior. State 860 may be considered a successor of state 850.

At time eleven, state 870 may represent a state of the system if the system is simulated from state 830 according to the first pattern of behavior. State 870 is a successor of state 840.

Note that some or all of the above states may be saved. If a request is received to restore the system to a saved state, the saved state can be loaded from storage (e.g., memory, disk) to restore the system. If, however, the requested state is not a saved state, the system may derive the requested state from state that is saved.

Derivation may be achieved in a number of ways. For example, suppose a first state and a second state are saved. Further suppose that a directed relationship exists between the first state and the second state. Now suppose a user requests a state which is between the first state and the second state. The directed relationship may be applied to the first and second states to derive the requested state.

Specifically, the first state and the second state may each define a value for a particular parameter, and the value may vary over time. The directed relationship may describe how the parameter value varies between the first state and the second state. Accordingly, a value for the parameter may be derived using the directed relationship, for example by interpolation, where the interpolation may be based on a polynomial that approximates the directed relationship.

Information in the request may also be used to derive the requested state. For example, if a user requests that the simulation be reset to a state 880 at time t=4, and time t=4 occurs between stored states 820 and 830, then the requested time may be used to derive a parameter value, for example, by interpolation.

Alternatively, the way that the parameter varies may be estimated by examining a number of states in succession. For example, if a simulation proceeds from state S1 to state S2 to state S3, and a parameter varies in a linear manner between states S1 and S3, then a value for the parameter at a state between S2 and S3 may be estimated by deriving a linear equation for the behavior of the parameter and applying the equation between states S2 and S3.

In the simulation represented by FIG. 8, if the user requests that the simulation be restored to a state 880 at time t=4, the identification and derivation of the requested state may be straightforward. However, if the user requests a state that follows a branch, a different approach may be taken.

For example, if the user requests that the simulation represented by FIG. 8 be reset to time t=9, then the state that should be restored may be ambiguous. For example, by simulating from state 830 according to a first pattern of behavior, the state of the simulation at time t=9 may be represented by state 890. However, by simulating from state 830 according to a second pattern of behavior, the state of the simulation at time t=9 is represented by state 892. If an ambiguity exists, the user may be presented with an interface for selecting a pattern of behavior to be applied. Alternatively, the simulation may proceed according to both patterns of behavior, and the user may be presented with a choice among resulting states (e.g., states 890 and 892).

Another way to derive a requested state may be to set the simulation to a known state, and then simulate from that known state to arrive at the requested state. The known state may be at a point in time that is before the point in time of the requested state, in which case simulation forward in time may be applied. Alternatively, the known state may at a point it time that is after the point in time of the requested state, in which case simulation backward in time may be applied. This simulation backward in time may, for example, use a numerical solver with a negative step size.

Figure 9:
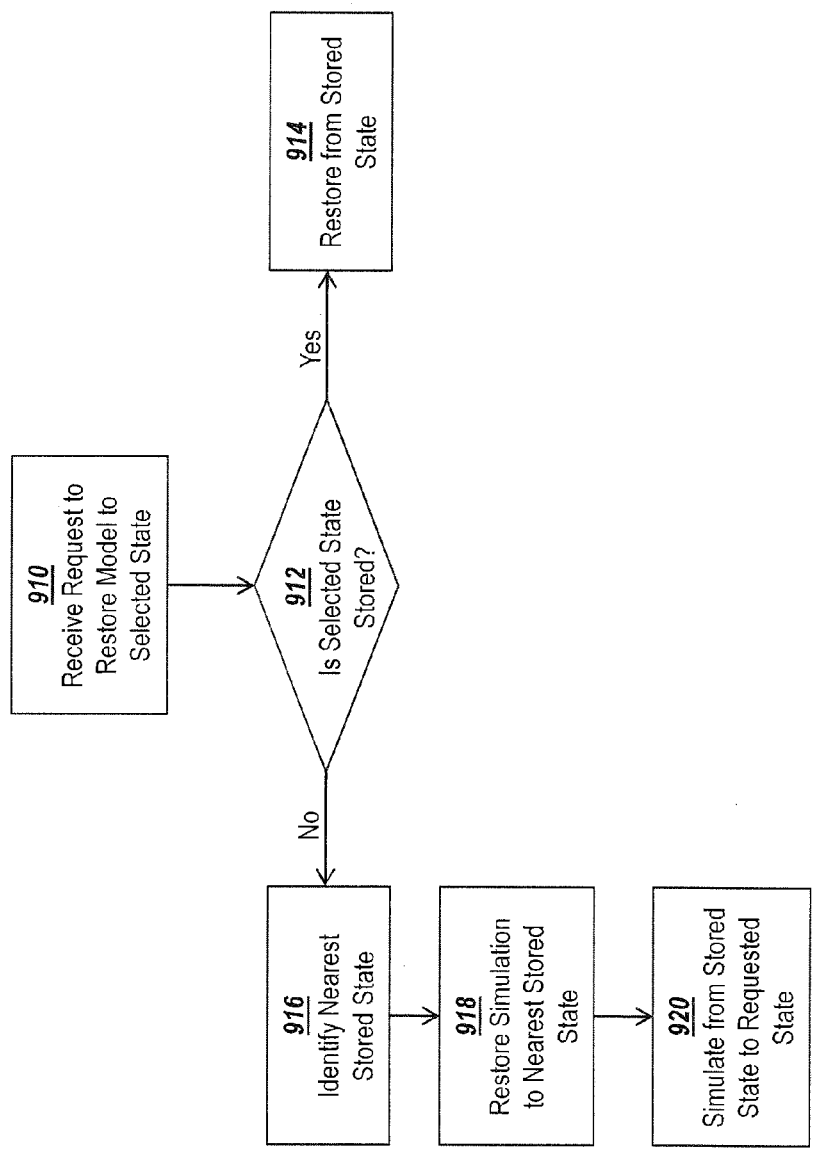
FIG. 9 illustrates a flowchart of example acts that may be used to interpolate between stored states.

FIG. 9 illustrates a flowchart depicting example acts that may be used to derive a state between stored states by simulating from a nearby stored state. Prior to block 910, a simulation may be run during which a number of states and directed relationships may be established and stored.

During the simulation, the states may be examined to determine whether redundant portions exist and the redundant portions may be handled accordingly. For example, if a first state and a second state contain the same information, then only one state may be stored. If a first and a second state partially contain the same information, then the stored first and second state may share the same information by including a reference from a stored state to the location of the shared information.

At block 910, a request may be received to restore a state of the simulation of a model to a selected state. The selected state may be identified in a number of different ways. For example, the request may include a requested simulation time to which the simulation may be restored. If the simulation involves branching behavior, the request may include one or more patterns of behavior which are to be assumed. The request may further identify the requested state based on a requested parameter.

The selected state may be one of the stored states, or the selected state may be a state that has not been stored. Accordingly, at block 912, it may be determined whether the requested state has already been stored. If the request state has already been stored, the system is restored to the stored state at block 914.

If the request state has not been already stored, then a state that approximates the requested state may be identified at block 916. The state that approximates the requested state may be determined, for example, by comparing one or more parameters of the stored states to one or more parameters of the requested state. The state which is the closest match may be selected as a best approximation of the requested state. It is not necessary that the closest match is selected as the approximating state; rather, the second closest match or some other approximating state may be utilized.

For example, if the requested state is identified by a simulation time, then the state associated with a simulation time that is closest to the requested simulation time may be identified. The identified state may occur before or after the requested state in a simulation.

At block 918, the simulation is restored to the nearest stored state identified at block 916. The nearest stored state may be used as an initial state of the simulation. At block 920, the simulation may be run from the nearest stored state. The simulation may be stopped when the simulation reaches the requested state.

Figure 10:
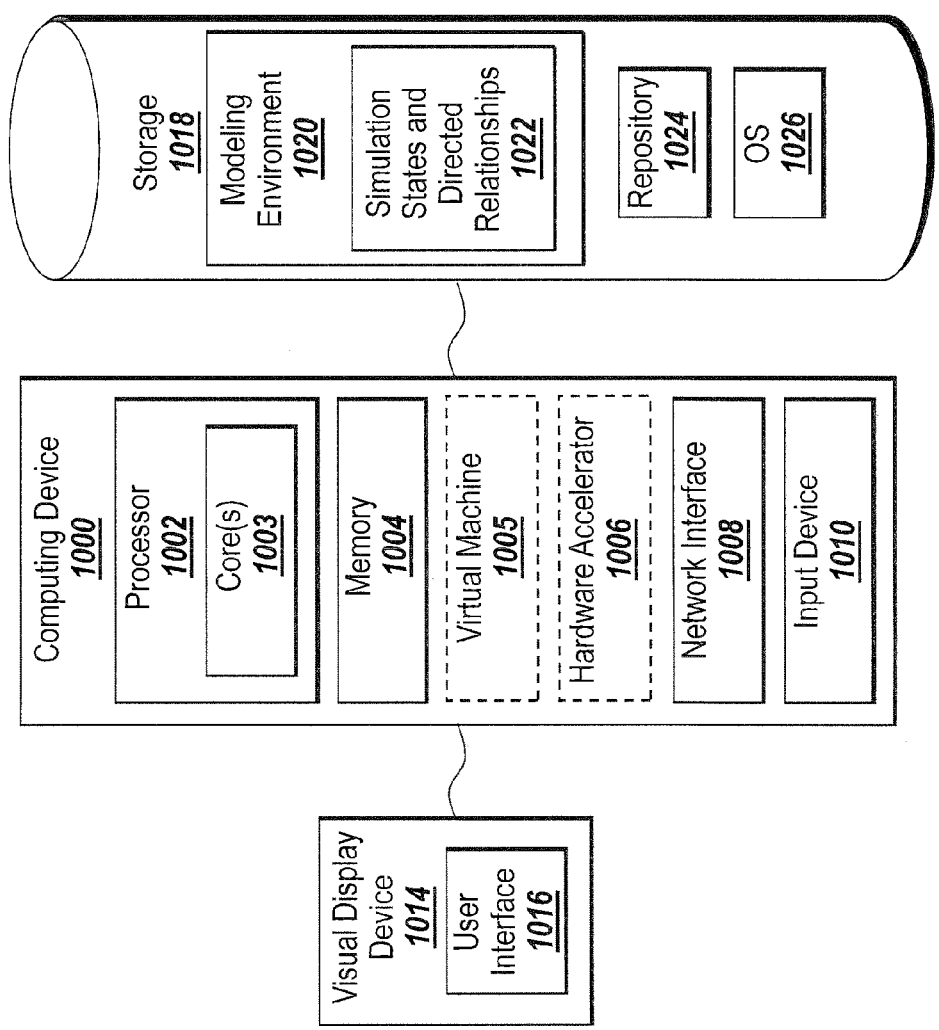
FIG. 10 illustrates an exemplary electronic device suitable for use with exemplary embodiments of the present invention.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 10 depicts an example of an electronic computing device 1000 that may be suitable for use with one or more acts disclosed herein.

The computing device 1000 may take many forms, including but not limited to a computer, workstation, server, network computer, quantum computer, optical computer, Internet appliance, mobile device, a pager, a tablet computer, a smart sensor, application specific processing device, etc. For example, an alternative implementation of the computing device 1000 may have fewer components, more components, or components that are in a configuration that differs from the configuration of FIG. 10. The components of FIG. 10 may be implemented using hardware based logic, software based logic and/or logic that is a combination of hardware and software based logic (e.g., hybrid logic); therefore, components illustrated in FIG. 10 are not limited to a specific type of logic.

The processor 1002 may include hardware or software based logic for executing instructions on behalf of the computing device 1000. The processor 1002 may include one or more processors, such as a microprocessor. The processor 1002 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 1002 may include single or multiple cores 1003 for executing software stored in a memory 1004, or other programs for controlling the computing device 1000.

The computing device 1000 may include one or more tangible non-transitory computer-readable storage media for storing one or more computer-executable instructions or software that may implement one or more embodiments of the invention. The media may include, for example, memory 1004 and storage 1018.

The memory 1004 may include a computer system memory or random access memory (RAM), such as dynamic RAM (DRAM), static RAM (SRAM), extended data out RAM (EDO RAM), etc. The memory 1004 may include other types of memory as well, or combinations thereof.

One or more processors 1002 may include virtual machine (VM) 1005 for executing the instructions loaded in the memory 1004. A virtual machine 1005 may be provided to handle a process running on multiple processors so that the process may appear to be using only one computing resource rather than multiple computing resources. Virtualization may be employed in the computing device 1000 so that infrastructure and resources in the computing device may be shared dynamically. Multiple VMs 1005 may be resident on a single processor 1002.

A hardware accelerator 1006, may be implemented in an ASIC, FPGA, or some other device. Hardware accelerator 1006 may be used to speed up the general processing rate of the computing device 1000.

The computing device 1000 may include a network interface 1008 which may interface the computing device 1000 to a communications network (e.g., Local Area Network (LAN), Wide Area Network (WAN), the Internet) through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 1008 may include a built-in network adapter, network interface card, personal computer memory card international association (PCMCIA) network card, card bus network adapter, wireless network adapter, universal serial bus (USB) network adapter, modem or any other device suitable for interfacing the computing device 1000 to any type of network capable of communication and performing the operations described herein.

The computing device 1000 may include one or more input devices 1010, such as a keyboard, a multi-point touch interface, or a pointing device (e.g., a mouse), that may be used to receive input from, for example, a user. Note that computing device 1000 may include other suitable I/O peripherals.

The input devices 1010 may be allow a user to provide input that is displayed on a visual display device 1014. A graphical user interface (GUI) 1016 may be shown on the display device 1014.

A storage device 1018 may also be associated with the computer 1000. The storage device 1018 may be, for example, a hard-drive, CD-ROM or DVD, Zip Drive, tape drive, or other suitable tangible computer readable storage medium capable of storing information. The storage device 1018 may store (1) application software programs, such as modeling environment 1020 (which may include, for example the Simulink® environment) including simulation states and directed relationships 1022, (2) a repository 1024, and (3) an operating system (OS). Note that the software programs may include computer-executable instructions that may implement one or more embodiments of the invention.

The modeling environment 1020 may also allow a user to create and store data relating to graphical entities. The modeling environment may include a textual interface that supports a set of commands that may allow interaction with the editor. Using this textual interface, the user may write special scripts that may perform automatic editing operations on a block diagram of a model. The user may interact with one or more windows that may act as canvases for the model. The model may be partitioned into multiple hierarchical levels through the use of subsystems and different levels of the model's hierarchy may be displayed in different canvases.

One or more interface tools within the modeling environment 1020 may be used by a user to create a block diagram model. For example, the interface tools may include a block palette, a wiring line connection tool, an annotation tool, a formatting tool, an attribute editing tool, a save/load tool and a publishing tool. The block palette may include a library of pre-defined blocks that may be available to the user for building the block diagram. The palette may be customized by the user to: (a) reorganize one or more blocks in some custom format, (b) delete one or more blocks, and/or (c) add one or more custom blocks that the user may have designed. The palette may allow one or more blocks to be dragged using a human-machine interface (such as a mouse or keyboard) from the palette on to a canvas that may be displayed in a window.

The modeling environment 1020 may run under the control of an operating system, such as OS 1026. The modeling environment 1020 may enable, for example, a user to build and simulate or execute a model of a system. The modeling environment 1020 may include a text-based modeling environment, a graphical modeling environment, or some other modeling environment. Examples of modeling environments that may implement one or more embodiments of the invention may include MATLAB® and Simulink®, Stateflow®, SimEvents®, and SimMechanics™ which are available from The MathWorks, Inc.; LabVIEW® or MATRIXx available from National Instruments, Inc; Mathematica® available from Wolfram Research, Inc.; Mathcad available from Mathsoft Engineering & Education Inc.; Maple™ available from Maplesoft, a division of Waterloo Maple Inc.; Comsol available from Comsol AB of Sweden; Scilab™ available from The French National Institution for Research in Computer Science and Control (INRIA), Le Chesnay Cedex, France; and GNU Octave, available from the GNU ProjectLabVIEW® or MATRIXx available from National Instruments, Inc.; SoftWIRE available from Measurement Computing; VisSim available from Visual Solutions; WiT available from DALSA Coreco; VEE Pro available from Agilent; Dymola available from Dynasim AB; Extend available from Imagine That, Inc.; Scicos available from The French National Institution for Research in Computer Science and Control (INRIA); MSC.Adams® available from MSC.Software Corporation; Rhapsody® and Rational® available from International Business Machines Corporation; ARTiSAN Studio available from ARTiSAN Software Tools, Inc.; and SCADE™ from Esterel Technologies, Inc.

The present techniques may also be applied in a number of languages and formalisms, such as the Modelica Language, Unified Modeling Language (UML), the Systems Modeling Language (SysML), Architecture Analysis & Design Language (AADL), and Modeling and Analysis of Real Time Embedded Systems (MARTE), among others. In addition, the present techniques are not limited to time-based block diagrams, entity flow networks, and state flow diagrams, but may be employed, in some embodiments, in other types of models such as dataflow diagrams.

In the modeling environment 1020, one or more instructions may be generated for the model. The instructions may be, for example source code, intermediate representations, etc., to be used to simulate the model or to execute the model on a target device. The generated instructions may be stored in a repository 1024. The modeling environment 1020 may enable processing the model using the instructions previously stored in the repository 1024.

Modeling environment 1020 may communicate with repository 1024. Modeling environment 1020 may generate instructions for model 1022 and store the instructions in the repository 1024. The instructions may be stored in the repository 1024, for example, as functions in software. Note that the instructions may be stored in the repository 1024 in other forms, such as processes that may be implemented in hardware. The instructions stored in the repository 1024 may be shared in processing other models to reduce memory or other requirements for processing other models.

The repository 1024 may include a collection of information that may be stored in memory or storage. The repository 1024 may be, for example, a database with code for functions and checksums for one or more of the functions.

The modeling environment 1020 may also include user interfaces and an execution engine. The modeling environment 1020 may allow a user to build a model of a system using user interfaces. The model may include, for example, blocks and lines. The blocks may define operations, and the lines may define relationships between the blocks.

The execution engine may compile and link the model to generate an executable form of instructions for carrying out execution of the model. The model may be executed to simulate the system represented by the model. The simulation of the model may determine the behavior of the system represented by the model.

Furthermore, the model need not strictly be a model of a dynamic system. For example, the storing and restoration of a model/simulation state may equally apply to a computational system in general. Accordingly, the model referred to herein may include an application that executes on a desktop or embedded computing device such as a rapid prototyping or production hardware target. In one embodiment, the simulation state may refer to an execution state of a computational application.

The execution engine may convert the model into an executable form. The executable form may include one or more executable instructions. The execution engine may compile and link the model to produce the executable form of the model. The executable form of the model may be executed to determine a behavior of the model. Compiling may involve checking an integrity and validity of one or more component interconnections in the model. Compiling may further involve inferring undetermined or inherited attributes of model elements such as, for example, the dimension of a variable, the data type of a variable, the complexity (whether an imaginary part exists) of variable, the sample time of a block or function, etc. The inferencing may be based on propagating the values of attributes that are determined or have been inferred previously. Here, the execution engine may also sort one or more components in the model into hierarchical lists that may be used to create one or more component method execution lists. When linking the model, the execution engine may use one or more results from the compilation of the model to, for example, allocate memory that may be needed for an execution of the executable form of the model. Linking may also involve producing one or more component method execution lists that may be used in the execution of the executable form. The block method execution lists may be generated because the components of a model may execute component methods by type (not by component) when the component has a sample hit. The execution engine may repetitively execute the instructions e.g., via successive time steps from an execution start time to a stop time specified by the user or until the execution is interrupted.

The execution engine may enable interpretive execution of part or all of the model. Likewise, the execution engine may enable compiled or accelerated execution of some or all of the model. Combinations of interpretive and compiled or accelerated execution may also be enabled by the execution engine.

The computing device 1000 may execute an operating system (OS) 1026. Examples of OS 1026 may include the Microsoft® Windows® operating systems, the Unix and Linux operating systems, the MacOS® for Macintosh computers, an embedded operating system, such as the Symbian OS, Android, iOS, a real-time operating system, an open source operating system, a proprietary operating system, operating systems for mobile computing devices, or other operating system capable of running on the computing device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 11:
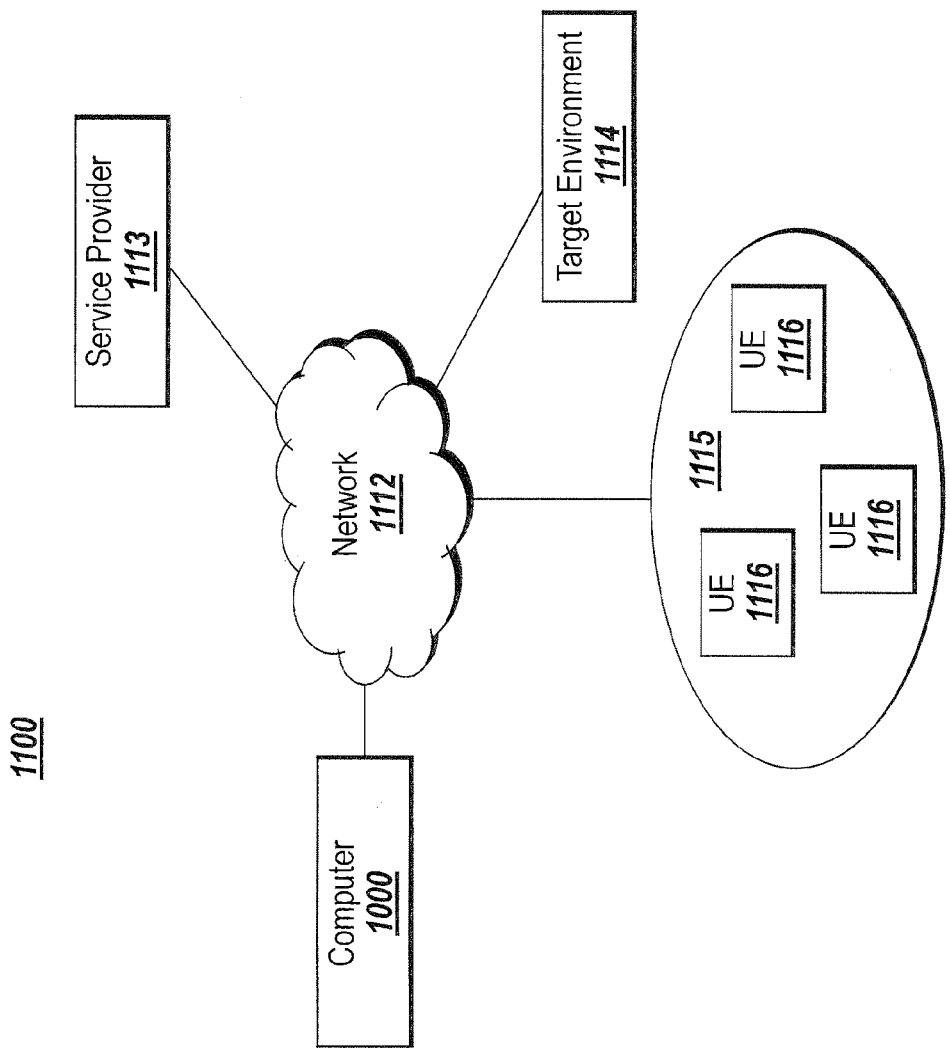
FIG. 11 depicts a network implementation suitable for use with exemplary embodiments of the present invention.

FIG. 11 depicts a distributed environment 1100 that may implement one or more embodiments of the invention. Distributed environment 1100 may include a computing device 1000 a communications network 1112, a service provider 1113, a target environment 1114, and a cluster 1115. The distributed environment 1100 illustrated in FIG. 11 is exemplary, and other distributed environments that may implement one or more embodiments of the invention may include more devices, fewer devices, or devices in arrangements that differ from the arrangement of the distributed environment 1100 depicted in FIG. 11.

The communications network 1112 may transport data from a source to a destination. Communications network 1112 may include one or more network devices, such as routers, switches, firewalls, and/or servers (not shown) and connections (e.g., links) to transport data. The data may include machine-readable information having a format that may be adapted for use in one or more communications networks and/or with one or more devices (e.g., the computer 1000, the service provider 1113, etc.). The data may include digital information or analog information. The data may further be packetized and/or non-packetized.

The communications network 1112 may be a hardwired network using wired conductors and/or optical fibers and/or may be a wireless network using free-space optical, radio frequency (RF), and/or acoustic transmission paths. In one implementation, the network 1112 may be a substantially open public network, such as the Internet. In another implementation, the communications network 1112 may be a more restricted network, such as a corporate virtual network. The communications network 1112 may include Internet, intranet, Local Area Network (LAN), Wide Area Network (WAN), Metropolitan Area Network (MAN), wireless network (e.g., using IEEE 802.11, Bluetooth, etc.), etc. The communications network 1112 may use middleware, such as Common Object Request Broker Architecture (CORBA) or Distributed Component Object Model (DCOM). Implementations of communications networks and/or devices operating in communications networks described herein are not limited to any particular data type, protocol, and/or architecture/configuration.

The service provider 1113 may include a device that makes a service available to another device. For example, the service provider 1113 may include an entity (e.g., an individual, a corporation, an educational institution, a government agency) that may provide one or more services to a destination using a server and/or other devices. Services may include instructions that are executed by a destination to perform an operation (e.g., an optimization operation). A service may include one or more instructions that may be executed on behalf of a destination to perform an operation on the destination's behalf.

The target environment 1114 may include a device that may receive information over the communications network 1112. For example, the target environment 1114 may be a device that receives user input from the computer 1110 via communications network 1112.

The cluster 1115 may include a number of units of execution (UEs) 1116 and may perform processing on behalf of the computer 1000 and/or another device, such as the service provider 1113. For example, the cluster 1115 may perform parallel processing on an operation received from the computer 1000. The cluster 1115 may include UEs 1116 that may reside on a single device or chip or that may reside on a number of devices or chips.

The units of execution (UEs) 1116 may include one or more processing devices that may perform operations on behalf of a device, such as a requesting device. A UE may be a microprocessor, field programmable gate array (FPGA), and/or another type of processing device. UE 1116 may include code, such as code for an operating environment. For example, a UE may run a portion of an operating environment that pertains to parallel processing activities. The service provider 1113 may operate the cluster 1115 and may provide interactive optimization capabilities to the computer 1000 on a subscription basis (e.g., via a web service).

UEs may provide remote/distributed processing capabilities for products, such as MATLAB® from The MathWorks, Inc. A UE may include one or more hardware units of execution and/or software units of execution. A hardware unit of execution may include a device (e.g., a hardware resource) that may perform and/or participate in parallel programming activities. For example, a may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), a System-on-Chip (SoC), a System-in-Package (SiP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (also referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Furthermore, not all of the acts depicted in the Figures are necessary in order to practice the invention. In some embodiments, one or more acts may be omitted.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

We claim:

1. A method comprising:
    capturing, using a processor of a computing device, a first simulation state during a simulation of a model;
    identifying that continued simulation of the model from the first simulation state may follow a first pattern of behavior and a second pattern of behavior;
    simulating the model from the first simulation state according to the first pattern of behavior to arrive at a second simulation state;
    simulating the model from the first simulation state according to the second pattern of behavior to arrive at a third simulation state;
    establishing a first directed relationship between the first simulation state and the second simulation state, the first directed relationship representing:
        a change of a state of the model from the first simulation state to the second simulation state, or
        a change of the state of the model from the second simulation state to the first simulation state;
    establishing a second directed relationship between the first simulation state and the third simulation state, the second directed relationship representing:
        a change of the state of the model from the first simulation state to the third simulation state, or
        a change of the state of the model from the third simulation state to the first simulation state; and
    storing information allowing at least the first simulation state to be restored.

2. The method of claim 1, wherein the model is simulated in continuous time and the first directed relationship and the second directed relationship are temporal relationships.

3. The method of claim 1, wherein the identifying further comprises:
    receiving an input specifying that the model is to be simulated in at least two different ways.

4. The method of claim 3, wherein the input specifies a simulation time from which the model is to be simulated in the at least two different ways.

5. The method of claim 3, wherein the input specifies one or more conditions which, if met, cause the model to be simulated in the at least two different ways.

6. The method of claim 1, wherein the simulating of the model from the first simulation state according to the first pattern of behavior and the simulating of the model from the first simulation state according to the second pattern of behavior are performed in parallel.

7. The method of claim 1, wherein the simulating of the model from the first simulation state according to the first pattern of behavior to arrive at the second simulation state of the model is performed by a first processor and the simulating of the model from the first state according to the second pattern of behavior to arrive at the third simulation state of the model is performed by a second processor.

8. The method of claim 1, wherein the simulating of the model according to the first pattern of behavior and the simulating of the model according to the second pattern of behavior result in two or more outcomes for the simulation, and the simulating further comprising:
    displaying a graph of the two or more outcomes.

9. The method of claim 1, further comprising:
    simulating the model according to the first pattern of behavior to arrive at a fourth simulation state, and simulating the model according to the second pattern of behavior to arrive at a fifth simulation state; and
    identifying that the fourth simulation state and the fifth simulation state are equivalent.

10. The method of claim 9, wherein the fourth simulation state and the fifth simulation state are identified as being equivalent based on at least an outcome of performing a differencing between the fourth simulation state and the fifth simulation state.

11. The method of claim 9, wherein the fourth simulation state and the fifth simulation state are identified as being equivalent if any outcome of simulating the fourth simulation state is equivalent to an outcome of simulating the fifth simulation state.

12. The method of claim 9, wherein the fourth simulation state and the fifth simulation state each comprise a value of an attribute associated with the model, and wherein the fourth simulation state and the fifth simulation state are identified as equivalent if the value of the attribute in the fourth simulation state is equal to, or within a predetermined tolerance of, the value of the attribute in the fifth simulation state.

13. The method of claim 12, wherein the identifying that the fourth simulation state and the fifth simulation state are equivalent further comprises:
    generating a checksum for the fourth simulation state;
    generating a checksum for the fifth simulation state; and
    identifying that the fourth simulation state and the fifth simulation state are equivalent if the checksum for the fourth simulation state is equal to the checksum of the fifth simulation state.

14. The method of claim 12, further comprising merging the fourth simulation state and the fifth simulation state when the fourth simulation state and the fifth simulation state are equivalent.

15. The method of claim 1, further comprising:
    presenting a user with a choice of simulating from the second simulation state or simulating from the third simulation state;
    receiving a selection of the second simulation state or the third simulation state; and
    simulating the system from the selected state.

16. The method of claim 1, wherein simulating according to the first pattern of behavior further comprises:
    reaching a predetermined acceptance point; and
    terminating the simulation according to the second pattern of behavior before the simulation according to the second pattern of behavior is complete.

17. A method comprising:
    capturing, using a processor of a computing device, a first simulation state during a simulation of a model;
    capturing a second simulation state during the simulation;

establishing a directed relationship between the first simulation state and the second simulation state, the directed relationship describing:
a change of the first simulation state into the second simulation state, or a change of the second simulation state into the first simulation state;
storing at least a portion of the first simulation state, at least a portion of the second simulation state, and information based on the directed relationship; and
deriving a third simulation state of the model, the deriving comprising:
using the directed relationship to determine the third simulation state, wherein:
the third simulation state represents a state of the model that occurs between the first simulation state and the second simulation state.

18. The method of claim 17, wherein the model is simulated in continuous time and the directed relationship is a temporal relationship.

19. The method of claim 17, further comprising:
identifying a portion of the first simulation state that is redundant with a portion of the second simulation state, wherein the storing comprises storing the redundant portion only once.

20. The method of claim 17, wherein the storing at least a portion of the first simulation state is performed after a triggering condition is met.

21. The method of claim 17, wherein the simulation is a hybrid simulation which is advanced in both discrete and continuous increments.

22. The method of claim 21, wherein the first simulation state and the second simulation state are non-consecutive states.

23. The method of claim 22, further comprising:
storing a plurality of simulation states;
receiving a request to restore the model to a selected simulation state, the selected simulation state being different from the stored plurality of simulation states;
identifying at least one simulation state in the plurality of simulation states that approximates the selected simulation state; and
simulating from the identified simulation state to arrive at the selected simulation state.

24. The method of claim 23, wherein the plurality of simulation states are each associated with a simulation time and the selected simulation state is identified by the selected simulation state's simulation time, and wherein identifying one of the plurality of simulation states that approximates the selected simulation state comprises:
identifying a simulation state among the plurality of simulation states whose simulation time is nearest to the simulation time of the selected state.

25. A non-transitory electronic device readable storage medium storing instructions, the instructions comprising:
instructions that, when executed by a processor, cause the processor to:
capture a first simulation state during a simulation of a model;
identify that continued simulation of the model from the first simulation state may follow a first pattern of behavior and a second pattern of behavior;
simulate the model from the first simulation state according to the first pattern of behavior to arrive at a second simulation state of the model;
simulate the model from the first simulation state according to the second pattern of behavior to arrive at a third simulation state of the model;
establish a first directed relationship between the first simulation state and the second simulation state, the directed relationship representing a change of a state of the model from the first simulation state to the second simulation state or a change of the state of the model from the second simulation state to the first simulation state;
establish a second directed relationship between the first simulation state and the third simulation state, the directed relationship representing a change of the state of the model from the first simulation state to the third simulation state or a change of the state of the model from the third simulation state to the first simulation state; and
store information allowing at least the first simulation state to be restored.

26. A system comprising:
a storage for storing a model of a system; and
a processor for:
capturing a first simulation state during a simulation of the model;
identifying that continued simulation of the model from the first simulation state may follow a first pattern of behavior and a second pattern of behavior;
simulating the model from the first simulation state according to the first pattern of behavior to arrive at a second simulation state of the model;
simulating the model from the first simulation state according to the second pattern of behavior to arrive at a third simulation state of the model;
establishing a first directed relationship between the first simulation state and the second simulation state, the directed relationship representing a change of a state of the model from the first simulation state to the second simulation state or a change of the state of the model from the second simulation state to the first simulation state;
establishing a second directed relationship between the first simulation state of the model and the third simulation state of the model, the directed relationship representing a change of the state of the model from the first simulation state to the third simulation state or a change of the state of the model from the third simulation state to the first simulation state; and
storing information allowing at least the first simulation state to be restored.

* * * * *